US 7,190,396 B2

(12) United States Patent
Sasaki

(10) Patent No.: US 7,190,396 B2
(45) Date of Patent: Mar. 13, 2007

(54) IMAGE PROCESSING CIRCUIT OF IMAGE INPUT DEVICE

(75) Inventor: Gen Sasaki, Osaka (JP)

(73) Assignee: Mega Chips Corporation, Osaka (JP)

( * ) Notice: Subject to any disclaimer, the term of this patent is extended or adjusted under 35 U.S.C. 154(b) by 586 days.

(21) Appl. No.: 10/694,909

(22) Filed: Oct. 29, 2003

(65) Prior Publication Data

US 2004/0105016 A1    Jun. 3, 2004

Related U.S. Application Data

(62) Division of application No. 09/459,574, filed on Dec. 13, 1999.

(30) Foreign Application Priority Data

Feb. 12, 1999    (JP)    ................................. 11-034979

(51) Int. Cl.
 H04N 5/202    (2006.01)
 H04N 5/235    (2006.01)
 H04N 3/14    (2006.01)
 G03F 3/08    (2006.01)

(52) U.S. Cl. .................. 348/254; 348/222.1; 348/279; 348/674; 358/519

(58) Field of Classification Search ................. 348/254
See application file for complete search history.

(56) References Cited

U.S. PATENT DOCUMENTS

| 4,805,013 | A | * | 2/1989 | Dei et al. ..................... 358/519 |
| 4,931,864 | A | * | 6/1990 | Kawamura et al. .......... 358/519 |
| 5,153,730 | A | * | 10/1992 | Nagasaki et al. ......... 348/231.6 |
| 5,361,094 | A | * | 11/1994 | Jang ............................ 348/254 |
| 5,473,372 | A | * | 12/1995 | Nobuoka et al. ............ 348/254 |
| 5,473,373 | A | * | 12/1995 | Hwung et al. ............... 348/254 |
| 5,661,575 | A | * | 8/1997 | Yamashita et al. ........... 358/519 |
| 5,691,821 | A | * | 11/1997 | Hieda et al. ................. 348/674 |
| 5,706,058 | A | * | 1/1998 | Okada ......................... 348/674 |
| 5,828,986 | A | * | 10/1998 | Horigome et al. ........... 348/552 |
| 6,166,781 | A | * | 12/2000 | Kwak et al. ................. 348/254 |
| 6,181,368 | B1 | * | 1/2001 | Takahashi et al. ............. 348/70 |
| 6,426,771 | B1 | * | 7/2002 | Kosugi ..................... 348/222.1 |

FOREIGN PATENT DOCUMENTS

JP    10-42181    2/1998

OTHER PUBLICATIONS

U.S. Appl. No. 09/504,082, filed Feb. 15, 2000, Sasaki.
U.S. Appl. No. 09/964,458, filed Sep. 28, 2001, Sasaki.
U.S. Appl. No. 09/985,373, filed Nov. 02, 2001, Sasaki.
U.S. Appl. No. 10/694,914, filed Oct. 29, 2003, Sasaki.
U.S. Appl. No. 10/694,913, filed Oct. 29, 2003, Sasaki.
U.S. Appl. No. 10/694,909, filed Oct. 29, 2003, Sasaki.

* cited by examiner

*Primary Examiner*—David Ometz
*Assistant Examiner*—Nhan Tran
(74) *Attorney, Agent, or Firm*—Oblon, Spivak, McClelland, Maier & Neustadt, P.C.

(57) ABSTRACT

In image input devices such as digital still cameras, processing is speeded up and power consumption is reduced by arranging in a RPU (23) performing real time processing of a pixel data from a CCD (21), such that only special exceptional image processing not being prepared previously is subjected to a software program processing in a CPU (24) and, in post processing in which a general image processing is carried out, a pixel data temporarily stored in a main memory (29) is inputted again to the RPU (23) and then processed. This enables to sharply speed up processing, and minimize a prolonged processing in the CPU (24) to reduce power consumption, when compared to the case of executing by software problem processing.

1 Claim, 27 Drawing Sheets

——— ARBITRARY BOUNDARY BLOCK

——— OPTIMIZED BLOCK
——— EQUALLY SPACED BLOCK

F I G. 30
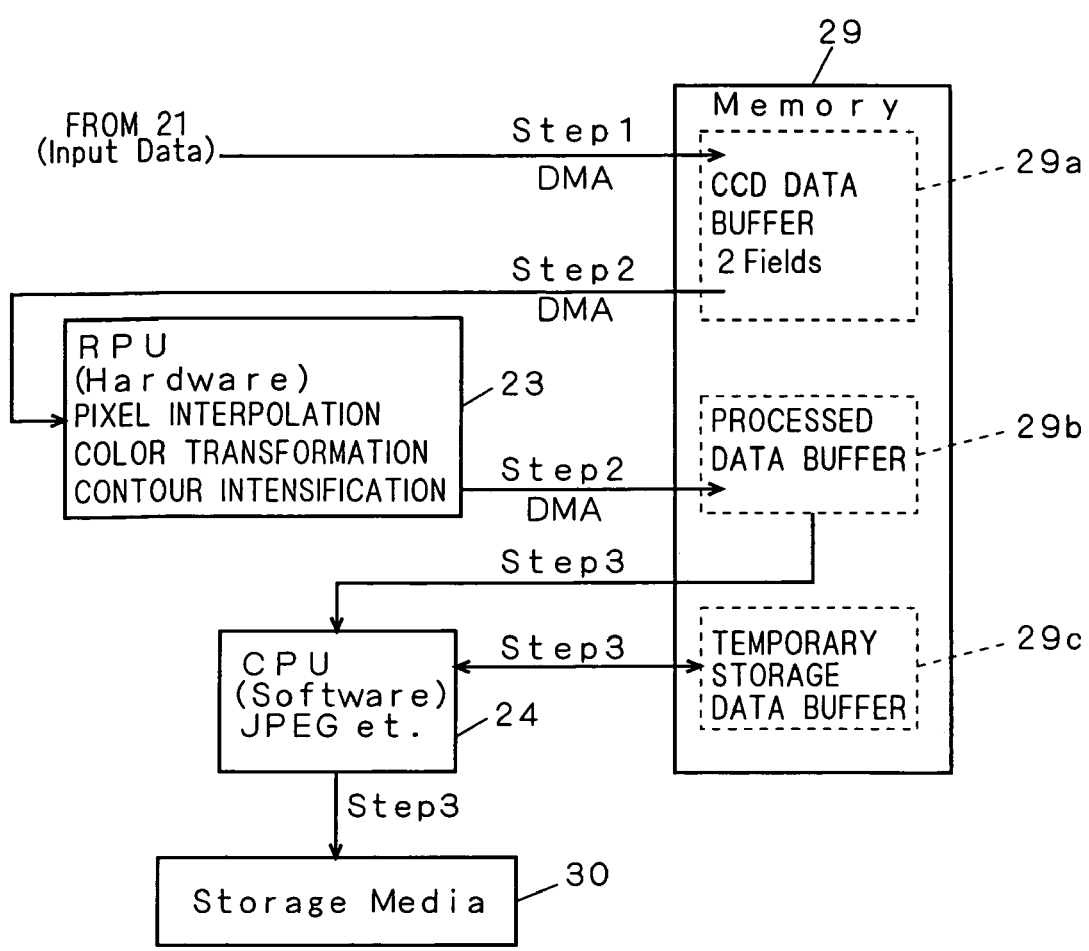

IMAGE PROCESSING CIRCUIT OF IMAGE INPUT DEVICE

CROSS-REFERENCE TO RELATED APPLICATIONS

This application is a divisional of co-pending U.S. patent application Ser. No. 09/459,574, filed Dec. 13, 1999, the entire contents of which are hereby incorporated herein by reference.

BACKGROUND OF THE INVENTION

1. Field of the Invention

The present invention relates to an image processing circuit of an image input device which perform predetermined image processing, such as pixel interpolation, color transformation, contour correction, filtering, and culling, in the image input device.

2. Description of the Background Art

In general, a digital still camera (image input device) is constructed as shown in FIG. 33. Specifically, drive to a CCD 1 and image capture are performed on an image processing circuit 2. After a predetermined image processing, such as pixel interpolation, color transformation, contour correction, filtering and culling are performed on the image processing circuit 2, the obtained image is displayed on a finder of a liquid crystal monitor 3 or the like, and an image data is stored in a predetermined self-contained memory 4. If required, the image data is preserved and stored in a memory card 5, and outputted to a predetermined external processing device (personal computer) or the like, through an external interface (I/F) 6. In FIG. 33, there are shown photographing lens 7, aperture device 8, optical lowpass filter 9, infrared cutting filter 10, strobe 11 and power 12.

As shown in FIGS. 34 and 35, the image processing circuit 2 is often provided with, in addition to CPU 2a, a real time processing unit (RPU) 2b executing real time image processing of the image obtained by the CCD1. It is therefore constructed such that only the CPU 2a conducts a variety of image processing of the image temporarily stored in the self-contained memory 4. That is, processing conducted by a conventional real time processing unit 2b is limited to real time image processing solely for performing finder operation, and is completely separated from software processing. Thus, changes in processing steps are mere parameter changes in each block.

In this case, the real time processing on the real time processing unit 2b is completely separated from the software processing on the CPU 2a. Therefore, if required a special processing that is not prepared in hardware as the real time processing unit 2b, a real time processing is suspended temporarily, and executes the special processing is conducted, followed by other general processing. Since it is constructed such that the image temporarily stored in the self-containing memory 4 cannot be processed on the real time processing unit 2b, the succeeding processing is all processed by software, as shown in FIG. 35. In this case, a hardware processing block (namely, the real time processing unit 2b) is not used at all, that is, from the beginning to the end, processing is executed by software processing on the CPU 2. Therefore, if required a small exceptional image processing, processing speed lowers excessively and much time is required for processing, thereby causing disadvantages of loosing a chance of photographing, and the like.

Alternatively, on the assumption that software processing is executed from the beginning, the CPU 2a is speeded up for high speed processing. In this case, however, power consumption increases excessively due to the high speed operation of the CPU 2a, thus making it difficult to handle complicated processing contents.

From the foregoing, with the conventional method, image processing may not always be made at high efficiency.

An object of the present invention is to provide an image processing circuit of a digital still camera which enables to execute high speed image processing and minimize power consumption, by constructing so that a real time processing unit can resume high speed operation after that only part needed in software processing is corrected by a CPU.

SUMMARY OF THE INVENTION

According to a first aspect, an image processing circuit of an image input device which performs a predetermined image processing of image photographed by an image pickup device in the image input device, comprises: a real time processing unit in which a predetermined general image processing of a pixel data being photographed by the image pickup device and inputted sequentially is performed by real time processing; a main memory that stores a pixel data outputted from at least the real time processing unit, in image frame units; and a central control unit in which with respect to image temporarily stored in the main memory, exceptional image processing except for the general image processing is executed as a software program processing, and then stored in the main memory, characterized in that the real time processing unit has at least a selector for selecting the pixel data being photographed by the image pickup device and inputted subsequently, and the pixel data of image temporarily stored in the main memory.

According to a second aspect, the image processing circuit of the first aspect is characterized in that: the real time processing unit is formed by connecting sequentially a plurality of image processing blocks; the foremost stage image processing block is connected such that the pixel data of image temporarily stored in the main memory is selectively inputted through the selector; at least one of the second and later image processing blocks is connected such that the pixel data inputted from the foremost stage image processing block and a pixel data of image temporarily stored in the main memory are selectively inputted through a predetermined other selector; the rearmost stage image processing block is connected such as to send a pixel data to the main memory; and at least one of the preceding image processing blocks than the rearmost stage image processing block is connected such as to send a pixel data to both the succeeding image processing block and the main memory.

According to a third aspect, the image processing circuit of the first or second aspect further comprises a timing generator for regulating operation timing of the real time processing unit and the image pickup device, the timing generator comprising: a synchronous control function of regulating synchronously operation timing of the real time processing unit and operation timing of the image pickup device, when the selector selects a pixel data being photographed by the image pickup device and inputted sequentially; and an asynchronous control function of regulating asynchronously operation timing of the real time processing unit and operation timing of the image pickup device, when the selector selects a pixel data of image temporarily stored in the main memory.

According to a fourth aspect, the image processing circuit according to any one of the first to third aspects is characterized in that the pixel data is inputted repetitively from the main memory to the real time processing unit such as to circulate over and over again, when the selector selects a pixel data of image temporarily stored in the main memory.

According to a fifth aspect, the image processing circuit according to any one of the first to fourth aspects is characterized in that: a pixel data to be sent/received among the real time processing unit, the main memory and the central control unit is produced by four component data in which a predetermined data length is applied to each of four pixel components; and at least one of the four component data is selected an arbitrary component data from component data processed by a general image processing in the real time processing unit.

According to a sixth aspect, the image processing circuit according to the first to fifth aspects is characterized in that the real time processing unit has functions of: when a pixel data being photographed by the image pickup device and sequentially inputted, or a pixel data from the main memory is a four-color system pixel data, storing each of four color component data of the four-color system pixel data in the component data; and when a pixel data being photographed by the image pickup device and sequentially inputted, or a pixel data from the main memory is a three-color system pixel data, adding, to the fourth color component data, an arbitrary component data processed by a general image processing in the real time processing unit, as a predetermined feature data of each pixel data, in addition to the three-color system pixel data.

According to a seventh aspect, an image processing circuit of an image input device which performs a predetermined image processing of image photographed by an image pickup device in the image input device, comprises: a real time processing unit in which a predetermined general image processing of a pixel data being photographed by the image pickup device and inputted sequentially is performed by real time processing; a main memory that stores a pixel data outputted from at least the real time processing unit, in image frame units; and a central control unit in which with respect to image temporarily stored in the main memory, exceptional image processing except for the general image processing is executed as a software program processing, and then stored in the main memory, characterized in that the real time processing unit has a cumulative addition processing function of, when each pixel data photographed by the image pickup device and inputted sequentially extends multiple frames, repeating, a predetermined number of times, a cumulative addition processing in which a pixel data residing on the same position in the preceding frame temporarily stored in the main memory is added to each pixel data in each of the frames from the image pickup device and the result is stored in the memory.

According to an eighth aspect, an image processing circuit of an image input device which performs a predetermined image processing of image photographed by an image pickup device in the image input device, comprises: a real time processing unit in which a predetermined general image processing of a pixel data being photographed by the image pickup device and inputted sequentially is performed by real time processing; a main memory that stores a pixel data outputted from at least the real time processing unit, in image frame units; and a central control unit in which with respect to image temporarily stored in the main memory, exceptional image processing except for the general image processing is executed as a software program processing, and then stored in the main memory, characterized in that the real time processing unit has a circulating addition processing function of, when each pixel data photographed by the image pickup device and inputted sequentially extends multiple frames, repeating, a predetermined number of times, a circulating addition processing in which a pixel data residing on the same position in the preceding frame temporarily stored in the main memory and each pixel data in each of the frames from the image pickup device are respectively subjected to multiplication with a predetermined weighting factor, followed by addition, and the results are stored in the memory; and the weighting factor used in the circulating addition processing comprising a first factor to be multiplied to a pixel data residing at the same position in the preceding frame temporarily stored in the main memory, and a second factor to be multiplied to each pixel data in each frame from the image pickup device, the first and second factors being set such that the sum of these factors is always one.

According to a ninth aspect, an image processing circuit of an image input device which performs a predetermined image processing of image photographed by an image pickup device in the image input device, comprises: a real time processing unit in which a predetermined general image processing of a pixel data being photographed by the image pickup device and inputted sequentially is performed by real time processing; a main memory that stores a pixel data outputted from at least the real time processing unit, in image frame units; and a central control unit in which with respect to image temporarily stored in the main memory, exceptional image processing except for the general image processing is executed as a software program processing, and then stored in the main memory, characterized in that the real time processing unit has a pixel compensation function with which each pixel data photographed by the image pickup device and inputted sequentially is multiplied by a predetermined pixel compensation parameter previously stored in the main memory, for a predetermined pixel compensation including shading compensation.

According to a tenth aspect, an image processing circuit of an image input device which performs a predetermined image processing of image photographed by an image pickup device in the image input device, comprises: a real time processing unit in which a predetermined general image processing of a pixel data being photographed by the image pickup device and inputted sequentially is performed by real time processing; a main memory that stores a pixel data outputted from at least the real time processing unit, in image frame units; and a central control unit in which with respect to image temporarily stored in the main memory, exceptional image processing except for the general image processing is executed as a software program processing, and then stored in the main memory, characterized in that: the real time processing unit has a function of selecting at least the cumulative addition processing function as defined in the seventh aspect, and the circulating addition processing function as defined in the eighth aspect.

According to an eleventh aspect, an image processing circuit of an image input device which performs a predetermined image processing of image photographed by an image pickup device in the image input device, comprises: a real time processing unit in which a predetermined general image processing of a pixel data being photographed by the image pickup device and inputted sequentially is performed by real time processing; a main memory that stores a pixel data outputted from at least the real time processing unit, in image frame units; and a central control unit in which with respect to image temporarily stored in the main memory, exceptional image processing except for the general image processing is executed as a software program processing, and then stored in the main memory, characterized in that the real time processing unit has a function of selecting the cumulative addition processing function as defined in the seventh aspect, the circulating addition processing function as defined in the eighth aspect, and the pixel compensation function as defined in the ninth aspect.

According to a twelfth aspect, the image processing circuit according to any one of the first to ninth aspects has the feature that the real time processing unit further comprises: a pixel reference block having a 3×3 pixel registers and two line memories, in which, to an objective pixel residing at the center of the 3×3 pixel registers, a reference is made from pixels surrounding the objective pixel; and a color selection block performing pixel interpolation about a color component, to the objective pixel in the pixel reference block, characterized in that the color selection block having a function of performing pixel interpolation, (i) when each pixel residing in the pixel reference block is of a 2×2 pixel array of four-color system, by using a first arithmetic processing in which a similar interpolation is conducted pixel by pixel, and (ii) when each pixel residing in the pixel reference block is of a pixel array of three-color system, by using a second arithmetic processing in which one component of a pixel in the three-color system is used as a fourth color pixel of a 2×2 pixel array similar to the four-color system, so that interpolation differs between one the component and other component is conducted.

According to a thirteenth aspect, the image processing circuit of the twelfth aspect is characterized in that the pixel array of three-color system is a RGB-Bayer produced by red, green and blue components; and the color selection block in the real time processing unit has a function of performing pixel interpolation in which, when each pixel residing in the pixel reference block is of a RGB-Bayer, the green component is used as a fourth color pixel of a 2×2 pixel array similar to the four-color system, so that the green component is disposed diagonally, and a pixel interpolation processing of interpolating the green component to other component is performed by finding a mean value of the green components in four pixels residing in both longitudinal and transverse directions of an objective pixel being other component, alternatively, by finding a mean value of two pixels that are obtained by eliminating the minimum and maximum values of the green components of four pixels residing in both longitudinal and transverse directions of an objective pixel being other component.

According to a fourteenth aspect, the image processing circuit according to any one of the first to thirteenth aspects is characterized in that the real time processing unit further comprises an auto focus evaluation block from which a high-frequency component evaluation value is outputted as an evaluation value used in an appropriate evaluation for auto focusing, the evaluation value being obtained by integration of the absolute value of a difference in a plurality of adjacent pixels having a predetermined identical component, with respect to a given region in a pixel array of image, the auto focus evaluation block comprising: a selector capable of selectively changing a clearance timing between a pair of pixels which are identical in component and objects for obtaining a difference; an arithmetic circuit for calculating the absolute value of a difference between a pair of pixels which are identical in component and spaced at a clearance timing selected by the selector; and a cumulative adder in which cumulative addition of absolute values sequentially outputted from the arithmetic circuit is performed a given number of times.

According to a fifteenth aspect, an image processing circuit of an image input device which performs a predetermined image processing of image photographed by an image pickup device in the image input device, comprises: a real time processing unit in which a predetermined general image processing of a pixel data being photographed by the image pickup device and inputted sequentially is performed by real time processing; and a main memory that stores a pixel data outputted from at least the real time processing unit, in image frame units, characterized in that the real time processing unit further comprises a defective pixel compensation block that reads defective pixel addresses stored in the main memory disposed outside of the real time processing unit, and performs defective pixel compensation when a pixel address of a pixel data residing in image matches the defective pixel address.

According to a sixteen aspect, the image processing circuit of the fifteenth aspect has the feature that, when a plurality of defective pixel addresses are present in the main memory, the defective pixel addresses are stored in the order of a pixel array sequence; the defective pixel compensation block of the real processing unit comprises: a shift register with a plurality of registers connected in series, to which defective pixel addresses stored in the main memory are inputted sequentially; and a comparator connected to the rearmost stage of the shift register in which an address count value of a pixel data inputted sequentially is compared with a defective pixel address provided from the rearmost stage and, when a match is found, a defective pixel timing signal is outputted, characterized in that: the shift register holds a defective pixel address, and output of the rearmost stage is looped to an input terminal of the foremost stage; the comparator is a comparator in which an address count value of a pixel data inputted sequentially is compared with a defective pixel address provided from the rearmost stage and, when a match is found, a shift timing signal and a defective pixel timing signal are outputted; and shift of the shift register is executed by the shift timing signal provided from the comparator.

According to a seventeenth aspect, an image processing circuit of an image input device which performs a predetermined image processing of image photographed by an image pickup device in the image input device, comprises: a real time processing unit in which a predetermined general image processing of a pixel data being photographed by the image pickup device and inputted sequentially is performed by real time processing; a main memory that stores a pixel data outputted from at least the real time processing unit, in image frame units; and a central control unit in which with respect to image temporarily stored in the main memory, exceptional image processing except for the general image processing is executed as a software program processing, and then stored in the main memory, characterized in that the real time processing unit further comprises: a gamma compensation table capable of performing, when given a N-bit length pixel data, gamma compensation processing about the pixel data; and a selector in which, when given a N-bit length pixel data, the pixel data is inputted to the gamma compensation table; and when given a (N-2)-bit length pixel data, switching is made so that four data rows sequentially provided as a (N-2)-bit length pixel data, are respectively inputted to four look-up tables obtained by dividing the gamma compensation table into four.

According to an eighteenth aspect, the image processing circuit according to any one of the first to seventeenth aspects is characterized in that the real time processing unit comprises: a color space transformation circuit on which a pixel data of a first array system having a predetermined color component array is transformed to a second array system pixel data having a predetermined special color component; a special color look-up table in which only the predetermined special color component in the second array system pixel data transformed on the color space transformation circuit is inputted for numerical transformation with a predetermined function, and the result is outputted; and a multiplier in which components other than the predetermined special color component in the second array system pixel data are respectively multiplied by a value outputted from the special color look-up table.

According to a nineteenth aspect, the image processing circuit of the twelfth or thirteenth aspect is characterized in that the real time processing unit comprises: a selector that selects a high-frequency component signal of green component obtained on the pixel reference block in the color selection block, and the fourth color pixel stored in the main memory; a feature data look-up table in which data selected by the selector is inputted as a feature data, for numerical transformation with a predetermined function, and the result is outputted; and a multiplier in which each component of a pixel data of a predetermined pixel array is multiplied by a value outputted from the feature data look-up table.

According to a twentieth aspect, the image processing circuit of the twelfth or thirteenth aspect is characterized in that the real time processing unit comprises: a selector that selects the fourth color pixel of each pixel that is stored in the pixel reference block in the color selection block, alternatively, provided from the image pickup device, and a pixel of one component in the three-color system pixel employed as a fourth color pixel of a 2×2 pixel array when handling the three-color system pixel array; a feature data look-up table in which a pixel selected by the selector is inputted as a feature data, for numerical transformation by a predetermined function, and the result is outputted; and a multiplier in which each component of a pixel data of a predetermined pixel array is multiplied by a value outputted from the feature data look-up table.

According to a twenty-first aspect, the image processing circuit of the twelfth or thirteenth aspects has the feature that the real time processing unit comprises: a color space transformation circuit on which a first array system pixel data having a predetermined color component array is transformed to a second array system pixel data having a predetermined special color component; and a selector performing switching as to whether the fourth color pixel data outputted from the color selection block, or data of one component in the first array system pixel data is allowed to be inputted to the color space transformation circuit, characterized in that the color space transformation circuit having a function of, when the selector allows data to be inputted to the color space transformation circuit, transforming the data thus allowed to the second array system pixel data, as a fourth color pixel data.

According to a twenty-second aspect, the image processing circuit according to any one of the first to twenty-first aspects has the feature that the real time processing unit further comprises an exposure determination evaluating unit in which an image frame is divided into multiple blocks of at least 3×3, and the integral value of a special color component of the preceding pixel in each block is obtained to output an evaluation value used in exposure determination when photographing with the image pickup device, characterized in that the exposure determination evaluating unit can arbitrarily change the border line between blocks in both longitudinal and transverse directions.

According to a twenty-third aspect, the image processing circuit according to any one of the first to twenty-second aspects has the feature that the real time processing unit further comprises: a spatial filter that processes a data constellation in a predetermined color space; and a contour correction block on which only a component after frequency conversion in the data constellation in the spatial filter, is subjected to gain adjustment for contour correction processing, characterized in that the contour correction block has a function of outputting, as an individual data, data obtained by performing gain adjustment only to a component after frequency conversion in the data constellation in the spatial filter, and original data in the spatial filter.

According to a twenty-fourth aspect, the image processing circuit of the twenty-third aspect has the feature that the real time processing unit further comprises: a coring function block that removes noise component in image during contour correction processing in the contour correction block, by outputting, only when the high-frequency special color component has an amplitude smaller than a predetermined threshold width, the amplitude regarding as being zero, by using a predetermined linear operation function; and a reverse gamma effect block that relatively changes an amplitude ratio of the high-frequency special color component, with respect to the predetermined threshold width in the coring function block, characterized in that: the revere gamma effect block determines the ratio by a predetermined ratio transform function, based on a special color component of an original data provided from the spatial filter; and the predetermined ratio transform function is set so that the amplitude ratio of the high-frequency special color component with respect to the predetermined threshold width, is gradually increased as the amount of the special color component of the original data is larger.

According to a twenty-fifth aspect, the image processing circuit of the twenty-third aspect is characterized in that the data constellation of the spatial filter in the real time processing unit is configured as a three-component data integration; and the real time processing unit can selectively perform a three-component output or four-color component output to the main memory and, in either case, can selectively output three components in the spatial filter and one component of a special color component after frequency conversion, with respect to at least output of one component.

According to a twenty-sixth aspect, the image processing circuit according to any one of the first to twenty-fifth aspects is characterized in that, when employing, as the image pickup device, an interlace type one in which even lines and odd lines are read out as two fields at a different timing, respectively, a first field pixel data related to either the even lines or the odd lines is stored in the main memory; and the real time processing unit performs, when a second field pixel data related to either the even lines or the odd lines is inputted sequentially from the image pickup device, a predetermined image processing including pixel interpolation, color space transformation and contour correction processing, by reading and referring to the first field pixel data of the main memory that corresponds to the second field pixel data, in synchronization with input of the second field pixel data.

According to a twenty-seventh aspect, the image processing circuit according to any one of the first to twenty-sixth aspects is characterized in that the real time processing unit has a line memory storing a predetermined number of pixel data per line; the main memory stores image in frame units to be provided from the image pickup device; the real time processing unit, when the number of pixels per line, photographed by the image pickup device, is greater than the number of pixel data in the line memory, divides horizontally the image in frame units to be outputted from the main memory into multiple blocks; and image data related to the image divided into the multiple blocks in the main memory is inputted sequentially to the line memory in the real time processing unit.

With the first aspect, real time processing of a pixel data inputted one after another, from the image pickup device, is carried out without storing the intermediate pixel data in the main memory, while only a special exceptional image processing not provided in the real time processing unit is conducted as a software program processing in the control unit (CPU). Thereafter, when a general image processing (post processing) is conducted, a pixel data temporarily stored in the main memory is inputted again to the real time processing unit and then processed. This enables to sharply speed up processing, and minimize a prolonged processing in the control unit to reduce power consumption, when compared to the case of executing by software problem processing.

With the second aspect, a pixel data in the main memory can be inputted to an image processing block in the middle stage (second stage or later stage) of the real time processing unit by making a selection with the selector, and a pixel data from an image processing block of the intermediate stage (the preceding stage than the rearmost stage) in the real time processing unit can be stored in the main memory. Thereby, only a special exceptional image processing not provided in the real time processing unit is conducted as a software program processing in the control unit (CPU), and thereafter, only the necessary processing in a general image processing can be processed in the real time processing unit. That is, part of a procedure can be omitted, thus enabling to speed up processing and reduce power consumption, when compared to the case that a pixel data in the main memory is always inputted to the foremost stage of the real time processing unit.

With the third aspect, when post processing is conducted, operation timing (processing clock) of the real time processing unit is regulated asynchronically with operation timing of the image pickup device. Therefore, for example, when operation timing (processing clock) of the real time processing unit is regulated at a speed higher than operation timing of the image pickup device, the speed of post processing is increased greatly. On the other hand, when the operation timing (processing clock) of the real time processing unit is regulated at a speed lower than the operation timing of the image pickup device, the power consumption in post processing is minimized.

With the fourth aspect, a pixel data in the main memory can pass through the real time processing unit many times. This facilitates to attain, if a spatial filter is disposed in the real time processing unit, such a feature expansion that the range of the spatial filter is increased equivalently. In a conventional real time processing unit, since only one path is processable when reading data from an image pickup device, the spatial filter size or the like is limited to ones which are actually provided within the real time processing unit, and only one time of individual functions is applied to signals. On the other hand, with the fourth aspect, each feature expansion is attainable by allowing a specified function to be recursively operated by data in post processing. Also, since a pixel data in the main memory can be inputted many times to the real time processing unit, it is facilitated to be processed by changing the order of a procedure originally set to the real time processing unit. Accordingly, processing can be completed in an extremely short time when compared to the case of executing such a change by software program processing in a control unit (CPU). In this connection, as in the third aspect, when operation timing (processing clock) of the real time processing unit is regulated at a speed higher than operation timing of the image pickup device, one path processing in the real time processing unit can be completed in an extremely short time. This enables to minimize an increase in photographing time, and minimize loss time caused in reading data from the image pickup device.

With the fifth aspect, at an output stage of the real time processing unit, to at least one signal of four component data, one component data of arbitrary components processed during general image processing in the real time processing unit can be selectively stored and outputted. This facilitates to output a specific output signal (e.g., the fourth color signal) as a feature data, by one path, without making any changes to an original signal. In this connection, supposing that a software problem processing is carried out in the control unit (CPU), it is necessary that after all pixel data are stored in the main memory, a feature data is moved to a specific output component (e.g., the fourth color component) per pixel combination of four components, thus requiring an enormous processing time. On the other hand, with the fifth aspect, processing can be conducted by real time at a high speed, without adversely affecting other general image processing. This realizes an improved efficiency of processing and less power consumption.

With the sixth aspect, in the real time processing unit capable of handling four-color system pixel data such as complementary color type, e.g., YMCG system, there is a feature in handling three-color system pixel data, such as RGB-Bayer. That is, with respect to data row of four colors' data length, not only three colors' data are stored and processed but also a feature data such as an intensifying component of each pixel, is stored and processed as signal of the fourth color data region. This enables to perform various nonlinear type processing and pixel unit processing at an extremely high speed. As compared to the case that only three colors data are stored and processed with respect to data row of four colors' data length, it is possible to utilize effectively memory bits of the main memory and attain an improved efficiency in data transfer processing among the real time processing unit, control unit and main memory. It is also achievable less power consumption than handling separately data constellation of feature data.

With the seventh aspect, when each pixel data inputted sequentially from the image pickup device to the real time processing unit extends multiple frames, cumulative addition can be performed by repeating a predetermined number of times that a pixel data residing on the same position in the preceding frame temporarily stored in the main memory is added to each pixel data in each frame inputted from the image pickup device. Therefore, by dividing the resulting cumulative addition data by the number of additions, it is possible to subtract noise of the charge storage block of the image pickup device, and obtain data having superior image S/N characteristics and sufficient signal level.

With the eighth aspect, when each pixel data inputted sequentially from the image pickup device to the real time processing unit extends multiple frames, weighting addition (circulating addition) can be performed by repeating a predetermined number of times that a pixel data residing on the same position in the preceding frame temporarily stored in the main memory is added to each pixel data in each frame inputted from the image pickup device, and deflated with a predetermined factor. Therefore, by dividing the resulting circulating addition data by the number of additions, it is possible to subtract noise of the charge storage block of the image pickup device, and obtain data having superior image S/N characteristics and sufficient signal level. In this case, it is arranged so as to conduct circulating addition while deflating with a predetermined factor. Therefore, circulating addition can be carried out many times without changing each pixel data length from original data length, and the limit of the number of additions can be eliminated by preventing overflow.

With the ninth aspect, when conducting a predetermined pixel compensation including shading compensation, compensation per pixel can be carried out easily at a high speed, by previously storing compensation data in pixel units in the main memory, and inputting compensation data in the main memory to the real time processing unit, when the image pickup device captures data.

With the tenth aspect, it is possible to select the cumulative addition processing function of the seventh aspect and the circulating addition processing function of the eighth aspect. This facilitates to cope with changes in the specification and design of digital still cameras. It is therefore possible to greatly expand versatility as an image processing circuit to be incorporated into a digital still camera.

With the eleventh aspect, it is possible to select the cumulative addition processing function of the seventh aspect, the circulating addition processing function of the eighth aspect, and the pixel compensation function of the ninth aspect. This facilitates to cope with changes in the specification and design of digital still cameras. It is therefore possible to greatly expand versatility as an image processing circuit to be incorporated into a digital still camera.

With the twelfth or thirteenth aspect, pixel compensation of an image pickup device of four (2×2) colors is carried out by the same arithmetic processing, whereas pixel compensation of an image pickup device of three colors, e.g., RGB-Bayer, can be handled by that part of color selection blocks is replaced as a particular solution, on the same circuit configuration. This allows to reduce circuit size and considerably suppress power consumption when compared to the case that different and independent arithmetic blocks are disposed for four-color system and three-color system.

With the fourteenth aspect, when creating a high-frequency component evaluation value for auto focus evaluation, the clearance pitch between objective pixels for obtaining a difference is made variable. This facilitates to change frequency represented by an evaluation value. That is, when it is brought into a sufficient level focus by the naked eye, the image residing in such a range requires no higher frequency than that. If a high frequency image is intensified to excess, the influence of noise is remarkable. In view of these, it is desirable to create a high-frequency component evaluation value at an appropriate frequency (namely, the clearance pitch between objective pixels for obtaining a difference). Note that such an appropriate frequency cannot be determined uniformly and theoretically because the degree of noise contamination changes depending on an image pickup device and other circuit configurations. Hence, by arranging so that in creating a high-frequency component evaluation value for auto focus evaluation, the clearance pitch between objective pixels for obtaining a difference is variable, it is possible to easily create a high-frequency component evaluation value based on an optimum frequency, according to an image pickup device and other circuit configurations.

With the fifteenth aspect, it is possible to reduce circuit size in the real time processing unit and reduce power consumption, thanks to the configuration that defective pixel addresses are stored by using the main memory disposed outside of the real time processing unit, without using the register in the real time processing unit.

With the sixteenth aspect, thanks to the construction that defective pixel addresses of the image pickup device are stored in the order in which the defective pixels occurred, in the main memory, and then inputted to the defective pixel compensation block formed by the shift register and comparator, compensation is executable without the limit of the number of defective pixels, unlike the case that defective pixel addresses are stored in a register within a real time processing unit.

With the seventeenth aspect, when the bit length of an input data is shorter by two bits than a single gamma compensation table, this table can function as four look-up tables for gamma compensation. Therefore, if the bit length is shorter by two bits, by utilizing effectively an excess bit region of the gamma compensation table, four look-up tables being independently operable per color, can be used without changing any circuit configuration.

With the eighteenth aspect, there is provided the color space transformation circuit for transforming a pixel data of a predetermined first array system to a pixel data of a predetermined second array system having a special color component, and only the special color component is subjected to numerical transformation with a predetermined function in the special color look-up table and, by the multiplier, components other than the special color component are respectively multiplied by the obtained value. Thereby, a predetermined processing, such as chroma suppression for dark part, chroma suppression for bright part and various gamma transformation, can be selectively executable on a single circuit. In addition, as defined in the fourth aspect, by repetitively inputting a pixel data to the real time processing unit over and over again, a predetermined processing, such as chroma suppression for dark part (false color prevention), chroma suppression for bright part, and various gamma transformation, can be processed recursively.

With the nineteenth or twentieth aspect, a selector selects the fourth color pixel of each pixel data, and the pixel of one component in the three-color system pixel that has employed as a fourth color pixel in a 2×2 pixel array, when handling a three-color system pixel array. The selected pixels are inputted as a feature data, to the feature data look-up table, followed by numeric conversion with a predetermined function. Each component of a pixel data in a predetermined pixel array is multiplied by the resulting value. Thereby, in either of real time processing or post processing, various processing such as edge chroma suppression and gamma compensation using a feature data, can be easily conducted at a high speed in the real time processing unit. Especially, when the fourth color pixel in a pixel data temporarily stored in the main memory is used as a feature data, as in the first or second aspect, the feature data (fourth color component) obtained by software program processing in the control unit (CPU), and the feature data (fourth color component) obtained earlier by processing conducted in the real time processing unit, can be directly utilized as a feature data, in a predetermined processing, such as chroma suppression.

This enables to reduce processing time considerably than executing these processing by software program processing, from the beginning to the end.

With the twenty-first aspect, as a fourth color component of a three-color system pixel array, e.g., RGB-Bayer, the fourth color pixel data outputted from the color selection block, and one component data in the first array system pixel data can be selectively inputted to the color space transformation circuit, so that the selected data can be added to the second array system pixel data with an arbitrary factor in the color space transformation circuit. Therefore, as a fourth color component outputted from the color selection block, high frequency component of green component (Gh component) or the like, can be inputted easily without adding any multiplier and adder. Also, a predetermined general processing, such as gain adjustment to Gh component, and addition to each color component, can be carried out easily.

With the twenty-second aspect, as to the block region divided for exposure determination evaluation, the boundary between blocks is free to change, which enables to select an optimum block boundary with less number of blocks. This leads to an improved precision of exposure determination evaluation while preventing an increase in calculation time.

With the twenty-third aspect, upon output of a pixel data after contour intensification, output of a spatial filter and the original signal can be separately provided for addition. Therefore, by arranging so that the calculation bit length of the central pixel having a large bit length in a pixel data of the spatial filter is represented by original data, and a contour intensifying component (high-frequency signal component) having a small bit length are outputted separately, the original data of the central pixel is multiplied by a factor, followed by addition. As a result, necessary and sufficient filter calculation is executable without increasing each pixel's bit length. It is therefore possible to lessen the total number of bits in data as a whole, and reduce circuit size. In addition, thanks to separation of an original signal from a high frequency signal, by applying nonlinear calculation called "coring" to the high frequency signal, contour intensification can be carried out easily while suppressing an increase in noise.

With the twenty-fourth or twenty-fifth aspect, when the signal after gamma compensation is subjected to contour intensification, coring is conducted and, at that time, the threshold width of coring can be changed easily by a special color component value of each pixel. This facilitates to strongly intensify a relatively bright part, permitting contour intensification while preventing an increase in noise.

With the twenty-fifth aspect, spatial frequency conversion is made to an arbitrary color component, and the results can be stored such as to overlap the original color component. Thereby, frequency conversion processing can be conducted individually per color, at a high speed.

With the twenty-sixth aspect, when using an interlace type image pickup device, a pixel data within the first field in the main memory is read and referred to in synchronization with input of a pixel data within the second field inputted from the image pickup device, to conduct a predetermined image processing, such as pixel interpolation, color space transformation and contour correction. Thereby, the image processing is completed at the same time readout of a pixel data in the second field is completed, thus increasing considerably the efficiency of processing. In addition, the image storage region of the main memory calls for only one field for the first field, thereby reducing the necessary capacity in the main memory.

With the twenty-seventh aspect, when a pixel data temporarily stored in the main memory is inputted and processed in the real time processing unit, the pixel data can be divided into multiple blocks. Thus, as compared to the case that the number of pixels photographed by the image pickup device is greater than the number of pixel data residing in the line memory in the real time processing unit, there are advantageous that the horizontal size of image can be retained under the number of pixels in the line memory, and, as to processing in the real time processing unit, no restriction is imposed on the horizontal pixel size of the image pickup device, thus leading to an image processing circuit with an improved versatility.

These and other objects, features, aspects and advantages of the present invention will become more apparent from the following detailed description of the present invention when taken in conjunction with the accompanying drawings.

BRIEF DESCRIPTION OF THE DRAWINGS

FIG. 30 is a block diagram of a conventional example of data input operation to a real time processing unit when an interlace type CCD is used;

DESCRIPTION OF THE PREFERRED EMBODIMENTS

Figure 1:
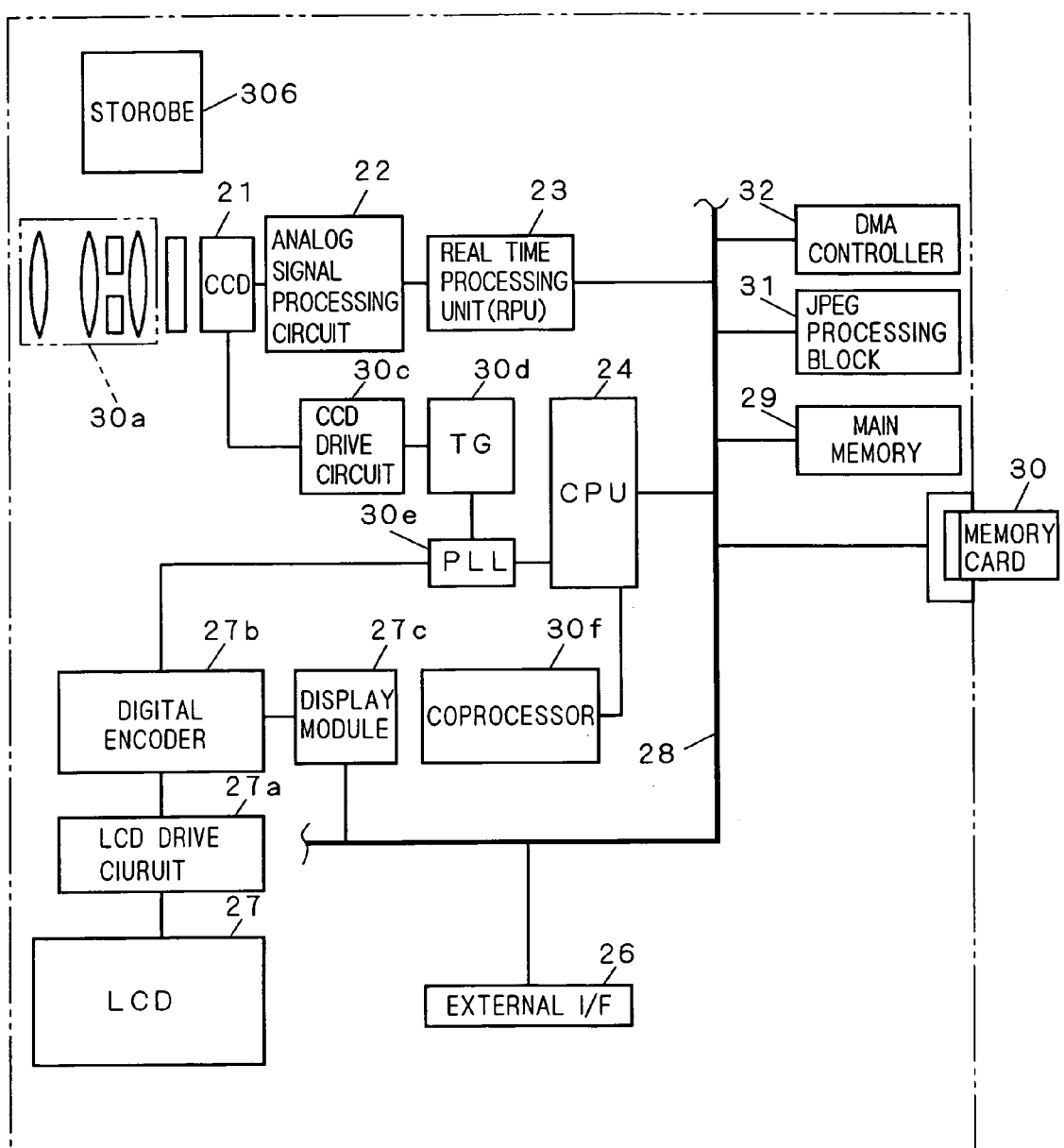
FIG. 1 is a block diagram schematically illustrating the overall construction of a digital still camera according to one preferred embodiment of the invention.

FIG. 1 is a diagram of a digital still camera according to one preferred embodiment of the invention. In the digital still camera, as shown in FIG. 1, the image photographed by a CCD (image pickup device) 21 is read by an analog signal processing circuit 22 for analog-digital conversion. To the digitized image, a predetermined general image processing, such as pixel interpolation, color transformation, contour correction, filtering and culling, is performed by real time processing at high speed in a real time processing unit (RPU) 23, and exceptional image processing including JPEG compression is executed by a CPU (central processing unit) 24. The obtained image is outputted to a predetermined processor (personal computer, etc.) via an external interface (I/F) 26, and also displayed on a LCD 27 as a finder. Alternatively, it is stored in a general main memory 29, such as a DRAM, SDRAM, etc. At this time, the image display on the finder 27 is executed in such a manner that, for supplying image to the finder (LCD 27), a predetermined processing such as a slight resolution reduction is performed by the real time processing unit 23, and the image is outputted one after another. With the push of an image taking button, etc. by the operator, a detailed image in the main memory 29 is stored at a stroke in storage media, e.g., a memory card 30.

Figure 2:
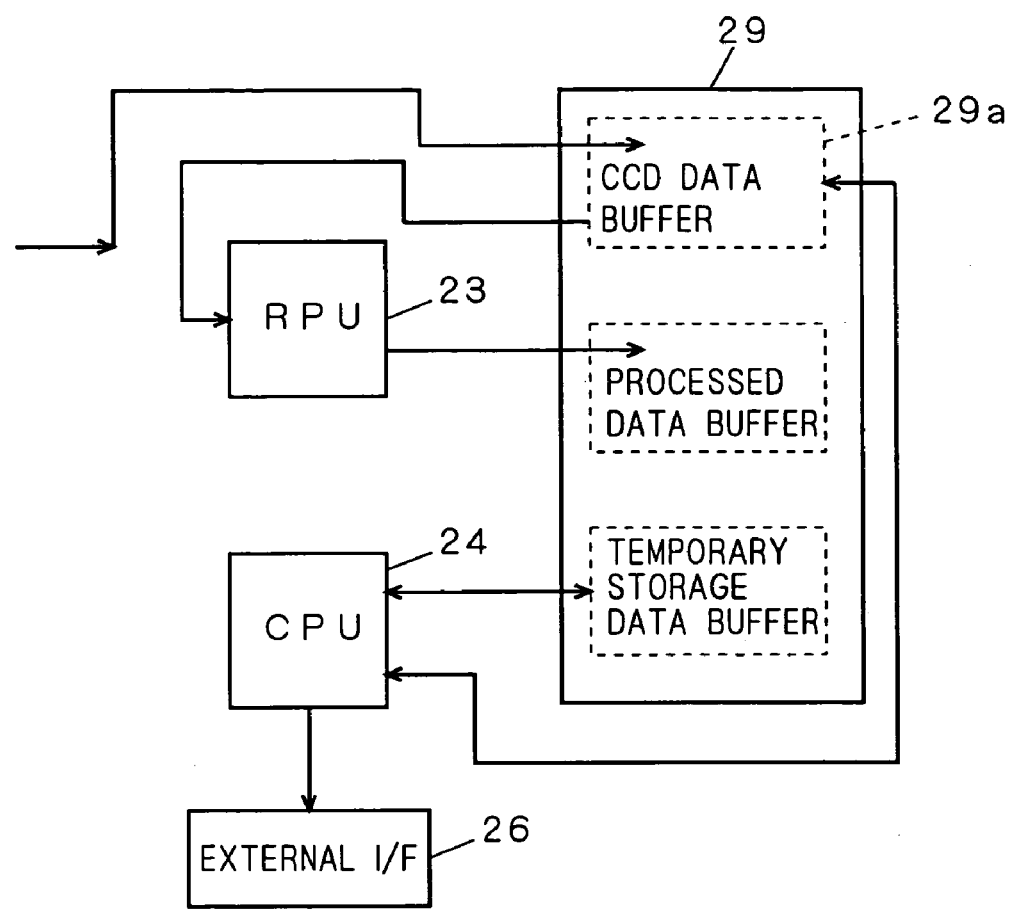
FIG. 2 is a block diagram illustrating the construction of data interchange between a real time processing unit and CPU of the digital still camera.
Figure 34:
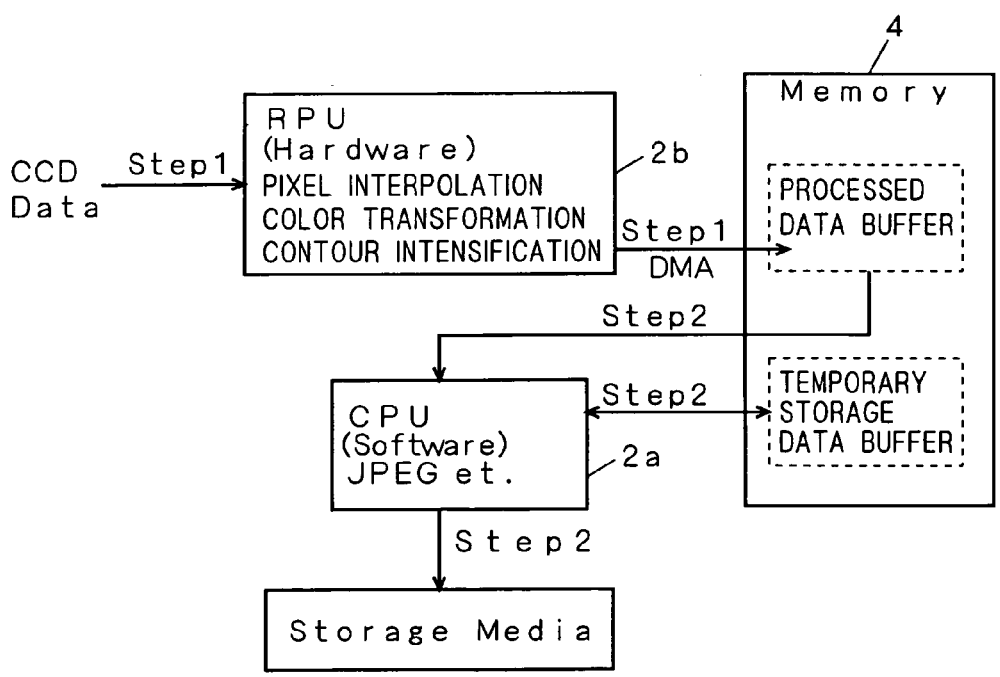
FIG. 34 is a block diagram illustrating operation of a real time processing in a real time processing unit.
Figure 35:
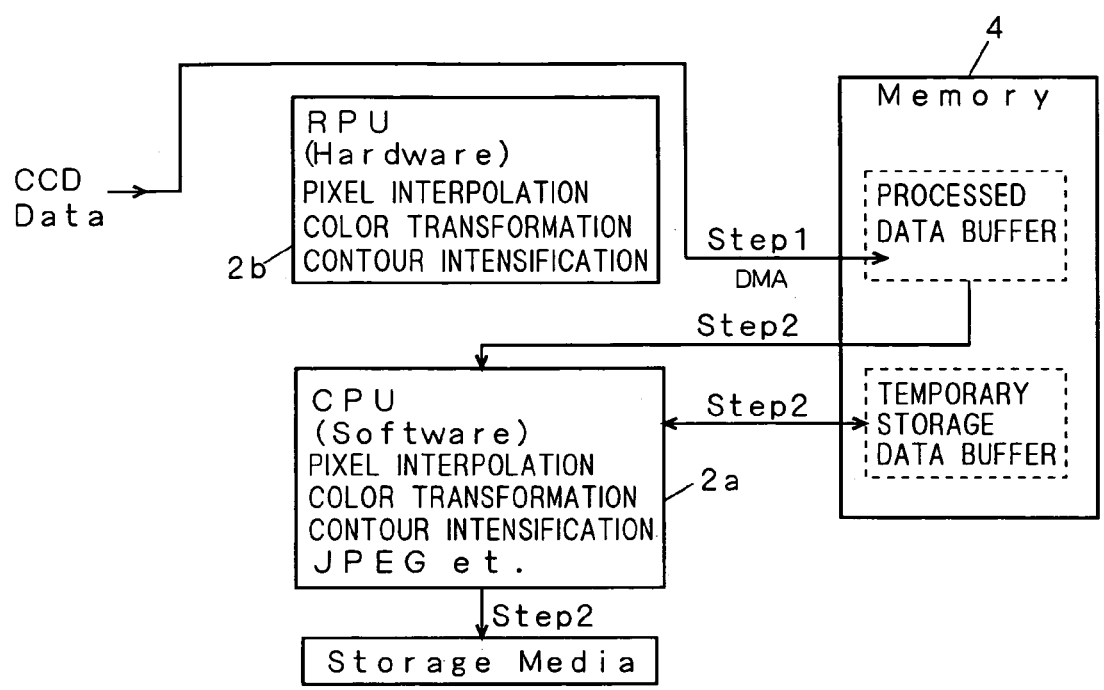
FIG. 35 is a block diagram illustrating operation when an exceptional image processing is performed by a CPU in conventional manner.

As to the image provided through the analog signal processing circuit 22, when a real time processing is executed, the intermediate pixel array data is not stored in the main memory 29 but directly processed by the RPU 23 (see FIG. 34). On the other hand, when no real time processing is executed, for example, as shown in FIG. 2, the image is processed by the CPU 24, and pixel array data temporarily stored in a CCD data buffer 29a of the main memory 29 is inputted to the real time processing unit 23 by direct memory access (DMA), to perform processing at a high speed.

That is, with the digital still camera of this embodiment, the various kinds of processing, such as pixel interpolation, color transformation and contour correction, of the image temporally stored in the main memory 29 can be rerun at any time in the real time processing unit 23. Thereby, for instance, with respect to only a desired part in image, a special processing that is not to be performed in the real time processing unit 23, is subjected to software processing and correction in the CPU 24, and thereafter other general processing and the like can be conducted at a high speed in the real time processing unit 23. This enables to speed up processing several times to tens times greater than performing all by software. Also, there is no need for the CPU 24 to perform processing at that time, thus leading to a reduction in power consumption.

The real time processing unit 23, CPU 24, external interface 26 are connected to a main bus 28, together with the main memory 29, memory card 30 and JPEG processing block 31. In order to reduce the load on the CPU 24 upon data interchange among these elements, data interchange via the main bus 28 is made between the elements, based on direct memory access (DMA) controller 32, not through the CPU 24.

In FIG. 1, there are shown a LCD drive circuit 27a driving the LCD 27, digital encoder 27b, display module 27c, optical mechanism 30a that has a lens with auto focus function, an aperture device, etc., strobe 30b, CCD drive circuit 30c driving the CCD 21, timing generator (TG) 30d that regulates operation timing of the real time processing unit 23 and CCD drive circuit 30c, PLL oscillator circuit 30e, and coprocessor 30f that is an auxiliary arithmetic unit of the CPU 24.

Configuration of CCD 21

The CCD 21 is a general one which houses a charge storage block and charge transfer block. It is possible to select either the interlace (jump scan) type one in which even lines and odd lines are read out, as two fields, by the analog signal processing circuit 22 at a different timing; or the progressive (inorder traversal) type one in which lines are read out sequentially in the order of the lines. It is, of course, possible to employ a CMOS sensor type one having no charge transfer block.

Configuration and Operation of Real Time Processing Unit 23

Figure 3:
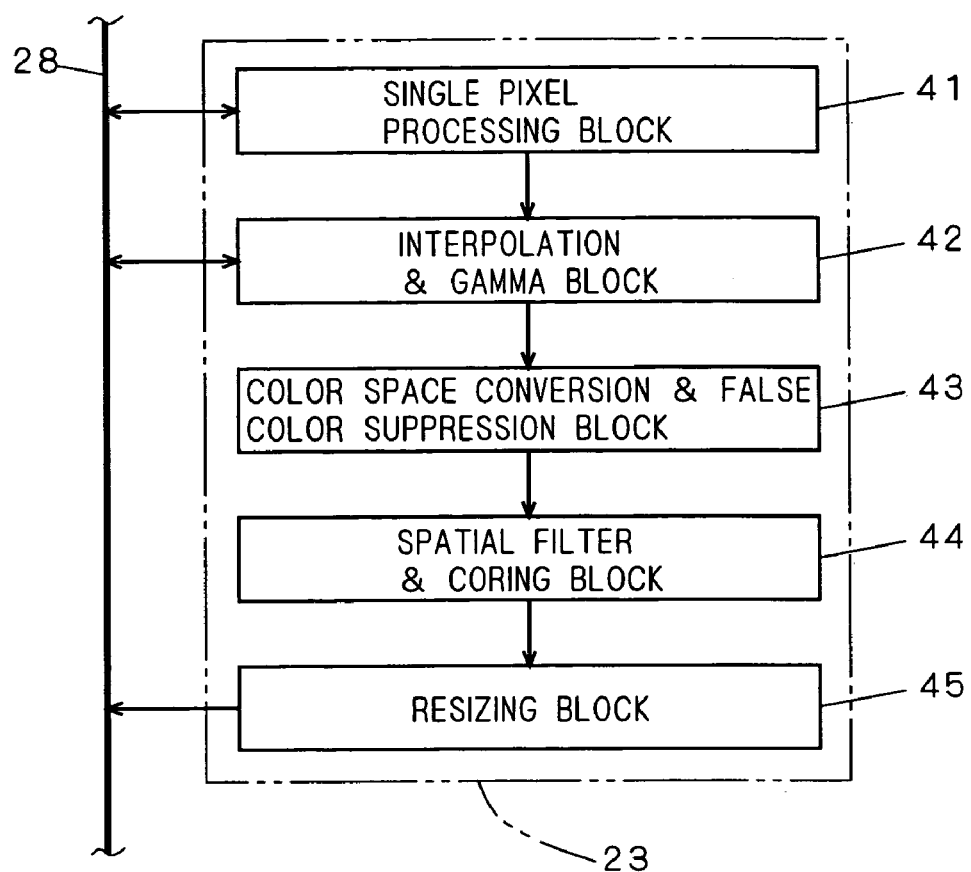
FIG. 3 is a block diagram schematically illustrating the internal construction of the real time processing unit of the digital still camera.

Referring to FIG. 3, a real time processing unit 23 comprises a single pixel processing block 41 in which the pixels obtained through an analog signal processing circuit 22 are processed pixel by pixel; interpolation & gamma block 42 that performs gamma processing while performing a predetermined pixel interpolation; color space transformation & false color suppression block 43; spatial filter & coring block 44; and resizing block 45 from which the image data obtained by the above-mentioned image processing is outputted to a main bus 28.

Particularly, it is configured so that the single pixel processing block 41 and interpolation & gamma block 42 can always fetch image temporarily stored in the main memory 29, under the control of the direct memory access (DMA) controller 32. Thus, input operation is executable not only to the single pixel processing block 41 disposed at the initial stage of the real time processing unit 23, but also to the interpolation & gamma block 42 disposed at an intermediate stage. Thereby, after the exceptional image processing of image is performed in the CPU 24, the processing in the intermediate stage (interpolation & gamma block 42) of the real time processing unit 23 is executable without passing through the single pixel processing block 41. Specifically, only the part for which the exceptional image processing is conducted is handled by software, and all the rest of it is handled by the high-speed real time processing unit 23, so that processing speed reduction is minimized.

In a practical digital still camera, the image data captured by the CCD 21 is, in some cases, subjected to a special exceptional image processing, for example, gamma compensation of "G (green)" component alone. Such exceptional processing is often unable to employ a function which is previously provided as hardware in the real time processing unit 23. Therefore, the image temporarily stored in the main memory 29 is subjected to various general image processing in the real time processing unit 23 (namely, post processing). In the digital still camera of this embodiment, at the time of the post processing, a processing clock of the real time processing unit 23 is set to a frequency higher than that in real time processing, so that the post processing is performed as high as possible. In general, a pixel read clock of the conventional CCD 21 is always synchronized with the processing clock for real time processing in the real time processing unit 23. It is therefore expected that the total processing time is considerably long when the CPU 24 performs the exceptional processing of image data in the CCD 21 and, after a temporal storage in the main memory 29, the post processing is resumed in the real time processing unit 23. Hence, in this embodiment, the processing clock of the real time processing unit 23 can be set independently and singly, such as to be asynchronous to the pixel read clock of the CCD 21, so that the processing speed of the real time processing unit 23 at the time of the post processing is greatly higher than the data transfer rate from the CCD 21. This enables to speed up the post processing two to four times greater than the case where the processing clock of the CCD 21 is synchronized with that of the real time processing unit 23.

Since the processing clock of the real time processing unit 23 is asynchronously speeded up than the data transfer rate from the CCD 21, one pass of the real time processing unit 23 terminates in an extremely short period of time. In view of the foregoing, even when in the post processing, data is allowed to run through the real time processing unit 23 many times, the overall processing speed cannot be much slower than the read-out rate of the CCD 21. Therefore, by allowing data to run through the real time processing unit 23 many times, without lowering the overall processing speed, a specified function is recursively operated by the data, to achieve feature expansion of each feature. For example, this facilitates to achieve such feature expansion that the range of a spatial filter 91 described later is increased equivalently.

Since the processing clock of the real time processing unit 23 can be brought into be asynchronous to the pixel read-out clock of the CCD 21, it is also, contrary to the above, possible to set the processing speed of the real time processing unit 23 such as to be lower than the transfer rate from the CCD 21. This effects a reduction in the power consumption of the real time processing unit 23.

In the above asynchronous case, change of the processing clock is performed by the timing generator (TG) 30*d* shown in FIG. 1. In setting the processing clock of the real time processing unit 23 by the timing generator (TG) 30, it is preferable that several clock frequencies are previously provided for easy switching of clock frequencies by a driver software program or by changing jumper pin connection or dip switch setting. With this configuration, power consumption characteristic and processing speed characteristic in post processing can be designed freely and easily.

Configuration and Operation of Single Pixel Processing Block 41

Figure 4:
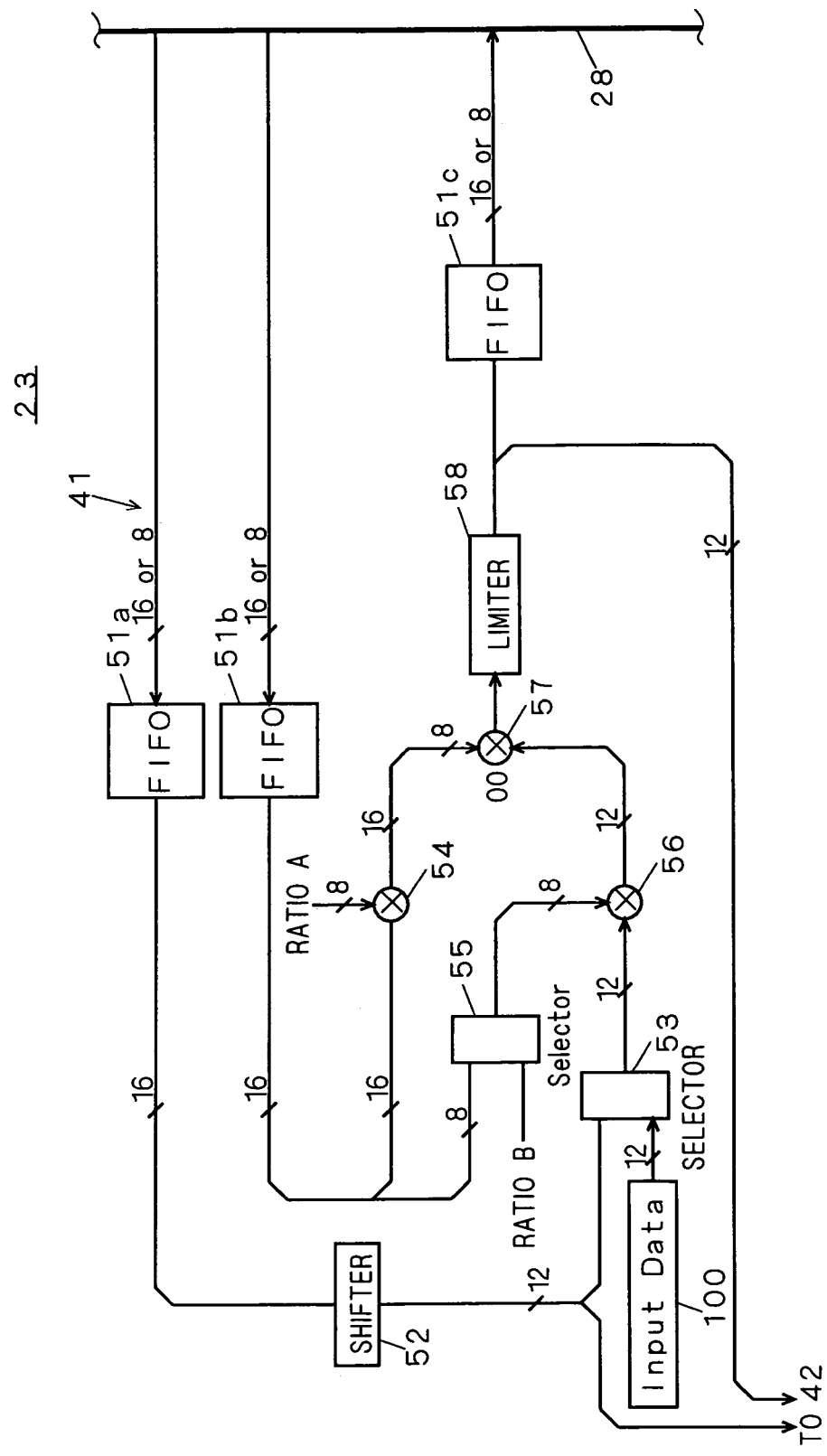
FIG. 4 is a block diagram illustrating the internal construction of a single pixel processing block in the real time processing unit.

A single pixel processing block 41 selectively performs either of "temporal balancing processing" among images in multiple frames and "shading compensation processing" in a single frame, by carrying out multiplication, addition, or both calculations, per pixel provided from an analog signal processing circuit 22. Specifically, as shown in FIG. 4, the single pixel processing block 41 comprises three FIFOs (buffers) 51*a* to 51*c* for regulating the timing of data input and output, each being connected to a main bus 28; a single shifter 52 to which a pixel data from the main bus 28 is inputted via the first FIFO 51*a*; a first selector 53 that selects a 12-bit length input data from the analog signal processing circuit 22 and a 12-bit length data from the shifter 52; a first multiplier 54 that multiplies a pixel data from the main bus 28 through the second FIFO 51*b*, by a predetermined first factor (ratio A); a second selector 55 that selects a pixel data from the main bus 28 through the second FIFO 51*b*, and a predetermined second factor (ratio B); a second multiplier 56 that multiplies the output value from the second selector 55 by the output value from the first selector 53; an adder 57 that adds the output value from the first multiplier 54 and the output value from the second multiplier 56; and a limiter & shifter 58 that receives the output value from the adder 57 and adapts the data after addition to be a fixed value, in order to output signals to the main bus 28 via the third FIFO 51*c*.

Conventionally, the single pixel processing block 41 performs no addition of image of multiple frames. Whereas in the "temporal balancing process" of the single pixel processing block 41, when the storage time of a CCD 21 extends multiple frames, data is read from the CCD 21 frame by frame, and the data was added to the corresponding pixel data residing on a main memory 29, thereby creating signal equivalent to the storage of the multiple frames on the CCD 21. In this case, the addition method can be selected from "cumulative addition" and "circulating addition."

Now description will be made of "cumulative addition."

Heretofore, when an object is dark and the storage time of the CCD 21 extends multiple frame (fields), readout from the charge storage block to the charge transfer block in the CCD 21 was stopped until the charge level was increased to reach a sufficient signal level, and a read pulse was applied to carry out photographing. In this manner, however, image S/N characteristics deteriorates due to the generation of noise charge on the charge storage block in the CCD 21. To avoid this, heretofore, the readout of charge has been performed by the normal cycle, and the readout signal has been processed on an analog electric circuit, or digital circuit by increasing gain. Even in this manner, random noise after readout is increased by a predetermined amplifier, thus lowering image S/N characteristics.

On the other hand, the digital still camera of this embodiment handles the above case in the following manner. With the normal readout cycle maintained to increase analog gain, the data temporarily stored in the main memory 29 is added to data of a newly readout frame (field) by the adder 57, and the obtained data is stored in the main memory 29 as an updated data. This procedure is repeated for performing cumulative addition over a period of time of multiple frames. The resulting cumulative addition data is divided by the number of additions, to obtain data having superior image S/N characteristics and sufficient signal level, without increasing noise on the charge storage block. Usually, most of noise on the charge storage block and charge transfer block in the CCD 21 and the analog signal processing circuit 22 is random noise. Then, letting the number of cumulative additions be N, the noise level decreases in proportion of the square of one-half of N. This permits a sharp reduction of random noise.

In this connection, the first selector 53 selects the input data from the analog signal processing circuit 22, and the second selector 55 selects a second factor (ratio B) given by the value of "1.0". In the adder 57, when a first factor (ratio A) is given by "1.0", it is possible to perform cumulative addition of the input data provided from the analog signal processing circuit 22 and the past cumulative data from the main memory 29 via the main bus 28 and second FIFO 51b.

Figure 5:
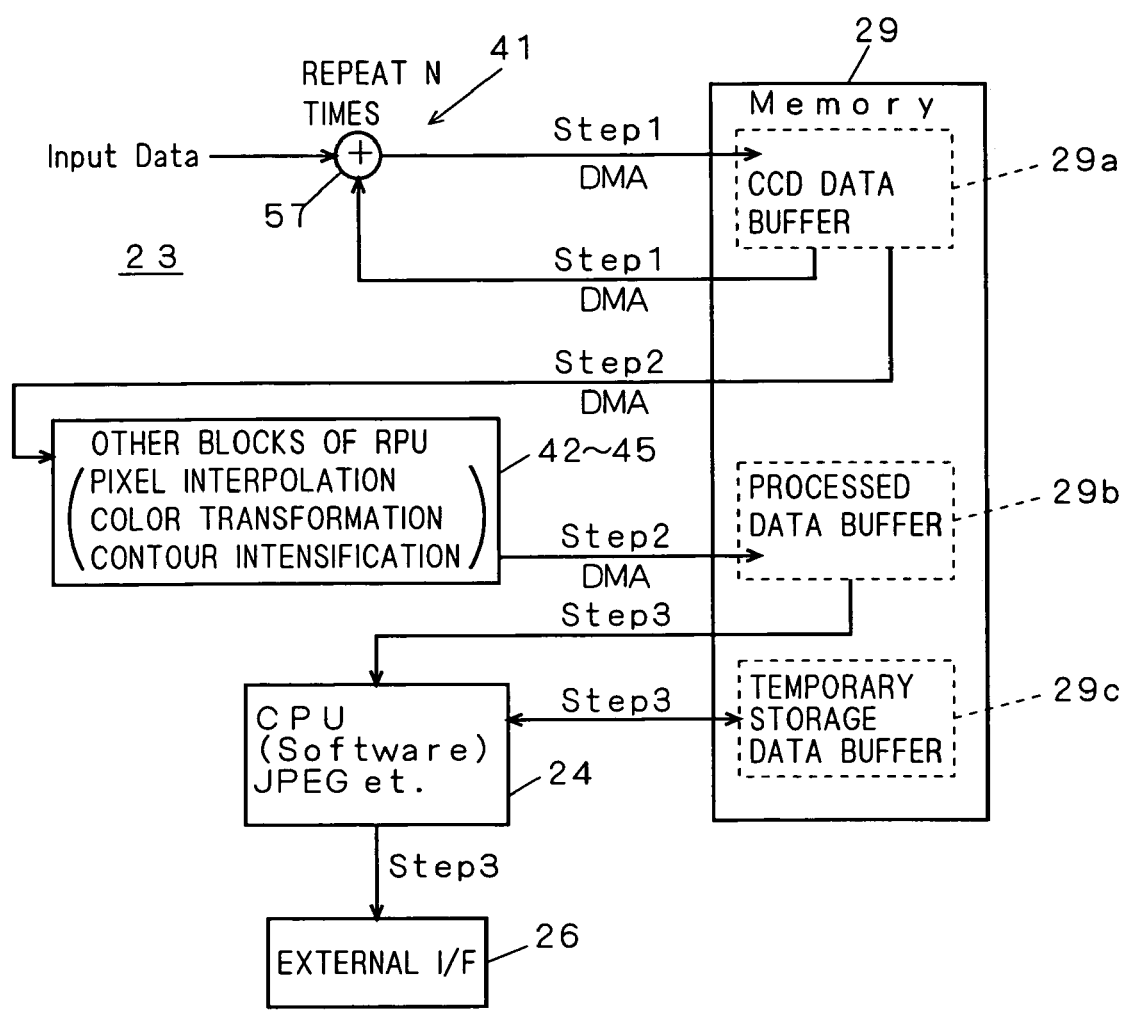
FIG. 5 is a diagram illustrating a procedure of the single pixel processing block at the time of cumulative addition processing.

FIG. 5 gives a procedure of a single pixel processing block 41 when the factors (ratio A, ratio B) as cumulative addition are set and selector 53 or 55 is selected. As shown in FIG. 5, an input data from the CCD 21 via an analog signal processing circuit 22 is accumulatively added to the data stored in a CCD data buffer 29a in a main memory 29, and the obtained data is stored in the CCD data buffer 29a as an updated data. After this cumulative addition is repeated N times, the resulting data is provided to other blocks 42 to 45 in a real time processing unit (RPU) 23, and is stored in frame units, in a processed data buffer 29b in the main memory 29. If necessary, this data is subjected to a predetermined software processing by a CPU 24, and the resulting data is stored in a temporal data buffer 29c in the main memory 29, and also outputted to an external I/F 26 or the like, via the main bus 28.

Herein, as to the cumulative data from the main memory 29 via the main bus 28, and the input data from the analog signal processing circuit 22, an individual cumulative calculation is carried out for a pixel data at the same position in a pixel array data, and the resulting data is sequentially stored in the main memory 29, as a pixel data of the same position.

As compared to the case that cumulative addition is carried out by storing image of multiple frames in memory, only one-frame capacity is required for the main memory 29 by employing the above configuration. This requires less memory capacity and also enables to reduce cost and power consumption. In addition, since the real time processing unit 23 can perform cumulative addition in synchronization with the readout of image in the CCD 21, addition processing can be speeded up sharply, when compared to, for example, the case that image of multiple frames is stored in a memory, and cumulative addition is performed by CPU operation according to some software program.

For the above "cumulative addition," the bit length extends with increasing the number of additions at the time of cumulative addition of image data. For instance, if an 8-bit image data is added 256 times, it is necessary to ensure a 16-bit data length. This means, conversely, that if ensured a 16-bit data length, the number of additions for an 8-bit image data is limited to 256, and part of signal may overflow above 256. For instance, when the real time processing unit 23 is designed such as to cope with up to 12-bit as an input data, if ensured a 16-bit data length, the number of cumulative additions to a 12-bit input data is up to only 16 ($=2^{16-1}2$) maximum. With such a small number of addition processing, no sufficient balancing processing might be performed depending on the brightness of an object, or the quantity of noise. Accordingly, when an improvement in S/N ratio is strongly demanded due to service conditions and the like, it is desirable, in some cases, to impose no limitations on the number of additions. Such situations is taken into consideration in "circulating addition" method.

In the "circulating addition," when the storage time of a CCD 21 extends for multiple frames, data is read per frame, from the CCD 21. As shown in FIG. 4, a first multiplier 54 multiplies a pixel data from a main memory 29 via a main bus 28 and second FIFO 51b, by $\alpha$ as a first factor (ratio A), and a second multiplier 56 multiplies an input data from the CCD 21 by $(1-\alpha)$ as a second factor (ratio B). Then, the obtained values are added to create signals equivalent to the storage on the CCD 21 for the multiple frames. Here, it is set so that the sum of the first factor (ratio A=$\alpha$) and the second factor (ratio B=$1-\alpha$) is "1". The value of $\alpha$ is set to an arbitrary value of greater than "0" and less than "1", based on experience gained from experiments and the like. Selections made in the first selector 53 and second selector 55 are the same as in the "cumulative addition" as described. With the "circulating addition" method, the latest input data after addition, and relatively recent input data of the past being present in the vicinity of the latest one can contribute highly than old input data, thereby causing some difficulties in terms of time balance of data. However, deflation of data length according to the number of additions, in the addition processing for reducing random noise, can produce the advantage that the number of additions can be increased without increasing the amount of data on the memory. Therefore, if desired a sufficient balancing processing depending on the brightness of an object and the quantity of noise, it is possible to carry out frame additions for a long period of time (infinite times), without increasing the data length on the storage block.

Figure 6:
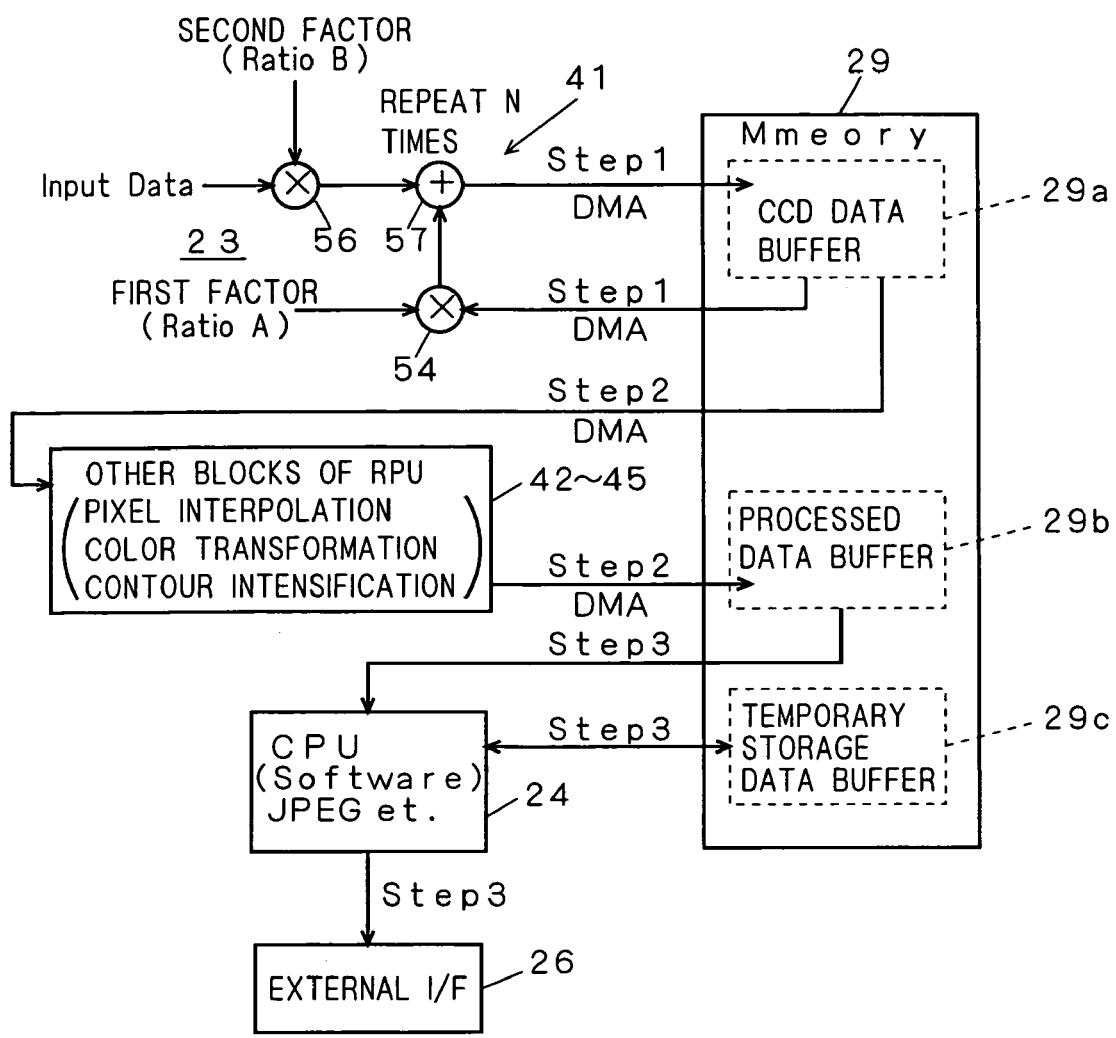
FIG. 6 is a diagram illustrating a procedure of the single pixel processing block at the time of circulating addition processing.

FIG. 6 gives a procedure of a single pixel processing block 41 when setting of factors (ratio A, ratio B) and selection of selectors 53 and 55 are made for circulating addition. As shown in FIG. 6, a second multiplier 56 multiplies input data from a CCD 21 via an analog signal processing circuit 22, by a second factor (ratio B=$1-\alpha$); a first multiplier 54 multiplies data stored in a CCD data buffer 29a in a main memory 29, by a first factor (ratio A=$\alpha$); an adder 57 adds these values, and the result is stored in the CCD data buffer 29a as an updated data. After this circulating addition is repeated N times, the obtained data is supplied to other blocks 42 to 45 in a real time processing unit (RPU) 23, and then stored in frame units in a processed data buffer 29b in the main memory 29. If necessary, this data is subjected to a predetermined software processing by a CPU 24, and the resulting data is stored in a temporal data buffer 29c in the main memory 29, and also outputted to an external I/F 26 or the like, via a main bus 28.

As shown in FIGS. 5 and 6, since "cumulative addition" and "circulating addition" can be selected arbitrarily by using the same circuit as in FIG. 4, there are the advantages that the degree of freedom of design is ensured and the versatility of the single pixel processing block 41 is increased.

Further, besides the addition processing for noise mitigation as described, "shading compensation processing" which is an entirely different function is selectable and executable.

Figure 7:
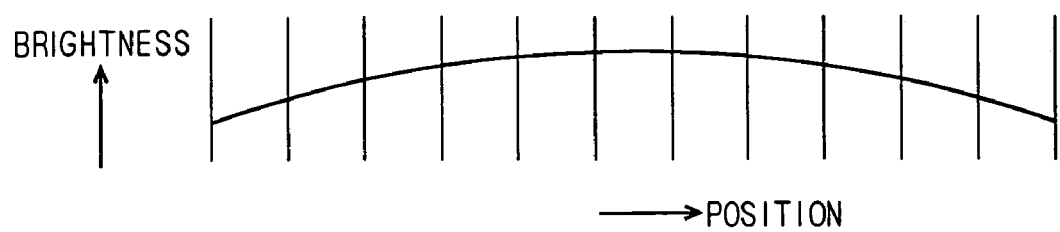
FIG. 7 is a luminance distribution chart illustrating the state that shading occurs in an image line.

Usually, in photographing an object or scenery by a CCD 21, there might occur shading that the periphery of lens is darker than its center, due to the optical operation of the lens. FIG. 7 gives a diagram illustrating a state that shading occurs in image, on which the abscissa represents the position of image lines and the ordinate represents brightness level. In FIG. 7, as compared to the center in image lines, its surroundings have a relatively low brightness. This phenomenon appears remarkably when using a wide-angle lens, etc. To suppress the shading, there is employed "shading compensation processing" to make gain adjustment of the brightness value of pixels, and the like.

Consider now the case where a CPU 24 performs software processing to conduct shading compensation. For instance, shading compensation per pixel is carried out in a conventional manner as follows. Memory in an amount of one line by which a multiplication factor (shading compensation parameter) is stored in a RPU, is provided to perform shading compensation of the lens, and the compensation is made by multiplying the data in the memory by an input data from the CCD 21. With this manner, however, only the horizontal compensation is possible. If desired the vertical compensation, it is therefore necessary to expand the memory such as to have multiplication factors for plural lines (shading compensation parameters), alternatively, to update data periodically by software. Accordingly, multiplication should be carried out with multiplication factors (shading compensation parameters) that differ from one pixel to another in a single line, which requires a large number of factors. As a result, the internal memory capacity is made enormous, and an extremely frequent data update by software is needed. It is therefore forced to that multiple horizontal pixels are considered collectively as a compensation unit, and multiple vertical lines are considered collectively as a compensation unit. Software processing thereof is very time-consuming, which is unfavorable.

Figure 8:
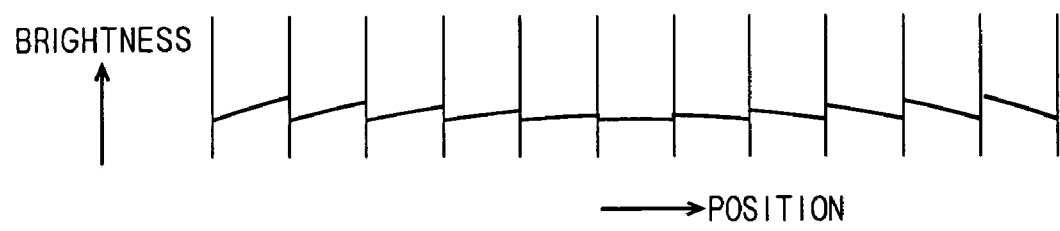
FIG. 8 is a luminance distribution chart illustrating the state that a luminance difference occurs when shading compensation is made block by block.

In another manner, the CPU 24 splits a one-frame image indicated by the vertical line in FIG. 7 into several lattice-like blocks, and shading compensation is conducted among these blocks. Unfortunately, as shown in FIG. 8, the shading compensation in block units causes a difference in brightness value at the boundary between blocks (indicated by the vertical line in FIG. 8), thereby producing an unnatural strip image as viewed by the eye.

Taking the foregoing problems into consideration, the real time processing unit 23 of the present embodiment is so configured that the single pixel processing block 41 performs shading compensation per pixel, at a high speed.

Specifically, shading compensation parameters assigned per pixel are stored on a compensation data storage region 29d in a main memory 29, and a compensation data is inputted to a real time processing unit 23 by direct memory access (DMA) when a CCD 21 captures an image data, thereby performing compensation per pixel. This enables to achieve high-speed shading compensation processing per pixel, without imposing any burden on a CPU 24 in connection with software processing. In particular, if there is such a commercial demand that a CMOS sensor is used instead of a CCD 21, the present invention is useful because a CMOS sensor of which readout circuit is independent per pixel, is liable to cause error per pixel, unlike a CCD sensor.

In addition, since there is no need to provide any special register in the real time processing unit 23, circuit configuration can be made simple, which minimizes cost and reduces power consumption.

Figure 9:
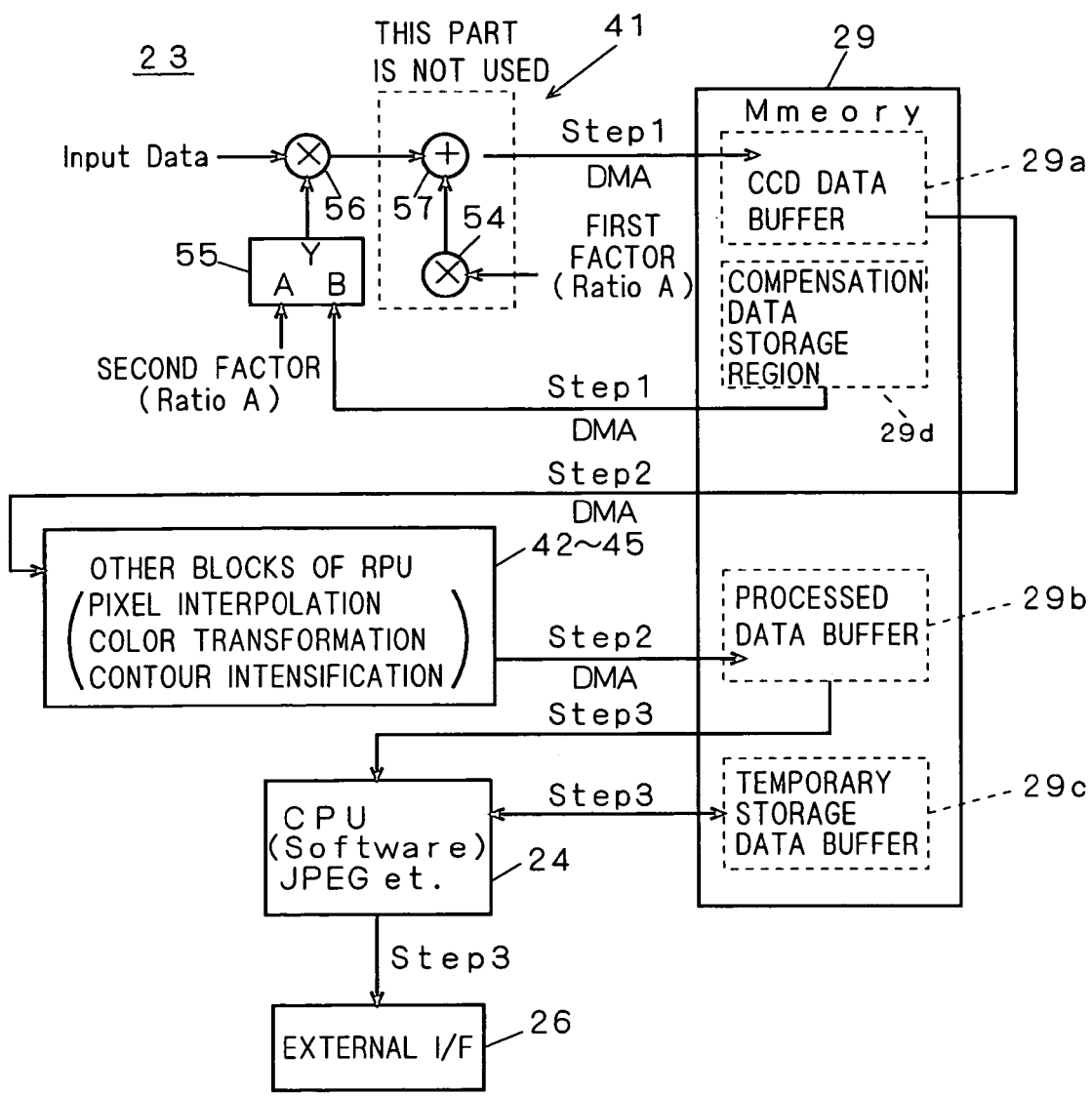
FIG. 9 is a diagram illustrating a procedure of the single pixel processing block at the time of shading compensation processing.

Referring to FIGS. 4 and 9, in the "shading compensation processing" as described, a second selector 55 selects a multiplication factor (shading compensation parameter) per pixel, which is provided from a compensation data storage region 29d in a main memory 29 through a main bus 28 and second FIFO 51b. A second multiplier 56 multiplies, pixel by pixel, an image data from a CCD 21 by the above selected multiplication factor, and then stores the resulting image data in a CCD data buffer 29a. Note that the first factor (ratio A) to be multiplied in a first multiplier 54 is "0", and the multiplied value results in "0", therefore, in an adder 57, "0" is added to the result obtained in the second multiplier 56. As a result, the output value from the second multiplier 56 is retained as it is, upon output of the adder 57.

Since the above circuit is the same as shown in FIG. 4, three functions of "cumulative addition" "circulating addition" and "shading compensation processing" are selectively usable in the same circuit. These functions can be selected easily only by selection made by the selectors 53 and 55, and by changing setting of the factors (ratio A, and ratio B) in a driver program (BIOS) used for drive control of a single pixel processing block 41 of a real time processing unit 23. Thus, the driver program may be set such as to limit to any one of the three functions "cumulative addition", "circulating addition" and "shading compensation processing." Alternatively, these functions may be changed by means of a command input, setting of jumper pins on the circuit substrate, or DIP switch setting.

Configuration and Operation of Interpolation & Gamma Block 42

An interpolation & gamma block 42 performs pixel interpolation when a CCD 21 captures image, and also performs gamma compensation of image.

Description will be now made of pixel interpolation function of the interpolation & gamma block 42.

In photographing a color image by a CCD 21, there are usually employed filters whose color differ from one pixel to another (complementary color type such as RGB-Bayer or YMCG system, etc.).

Figure 10:
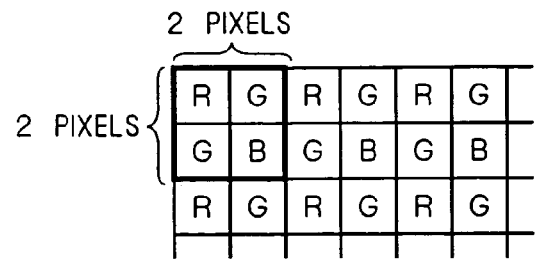
FIG. 10 is a diagram illustrating an example of pixel arrays of RGB-Bayer.

The RGB-Bayer applies a three-color system filter per pixel. In general, a pixel array comprises three colors of "R" (red component), "G" (green component) and "B" (blue component). As shown in FIG. 10, for example, either of odd lines and even lines form an array of "R, G, R, . . . , ", and the other forms an array of "G, B, G, B, . . . ". In this case, a couple of colors is recognized by 2×2=4 pixels, as indicated by the border of heavy line in FIG. 10, and "G" is disposed in both of the upper right and lower left within this border of heavy line.

Figure 11:
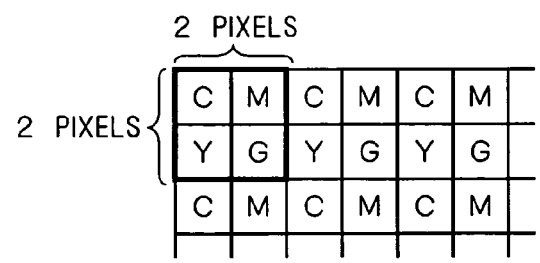
FIG. 11 is a diagram illustrating an example of pixel arrays of YMCG system complementary color type.

The complementary color type (YMCG system or YMCK system) applies a four-color system filter of which color component differs from one pixel to another. As shown in FIG. 11, for example, either of odd lines and even lines form an array of "C (cyan component), M (magenta component), C, M . . . ", and the other forms an array of "Y (yellow component), G (green component), Y, G, . . . (in the case of YMCG system)". This is also obtained by applying a filter of which color component differs from one pixel to another, and a couple of colors is recognized by 2×2=4 pixels, as indicated by the border of heavy line in FIG. 11.

Figure 12:
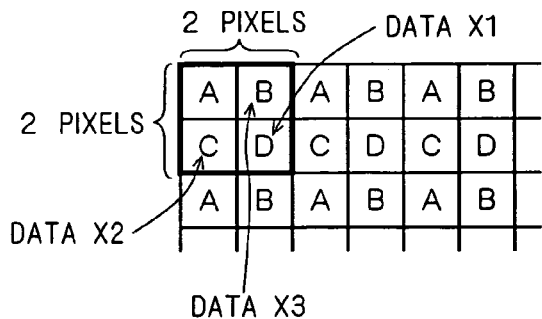
FIG. 12 is a diagram illustrating a general image array.

FIG. 12 gives a diagram representing pixel arrays of these RGB-Bayer and complementary color type (YMCG system, etc.) by alphabets "A", "B", "C" and "D". In a digital still camera of JPEG system, it is necessary to finally convert pixel by pixel, based on these pixel arrays, to Y (brightness), Cr (=α1 {R (red component)−Y (brightness)}), Cb (=α2 {B (blue component)−Y (brightness)}), which are JPEG system color space. Hereat, for example, only "D" component is present in DataX1 shown in FIG. 12. In performing interpolation of other "A", "B" and "C" components with respect to this pixel, these surrounding components should be referred to.

Figure 13:
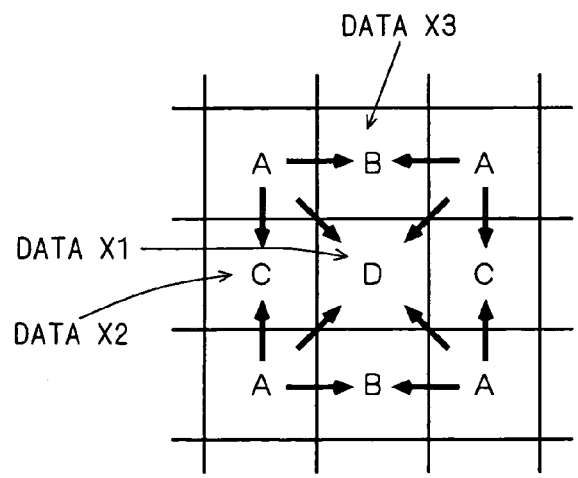
FIG. 13 is a diagram illustrating operation of a general pixel interpolation in a four-color system pixel array.

Specifically, taking the complementary color type (YMCG system, etc.) as example, as shown in FIG. 13, when "A" component is referred to in DataX1, "A" components in all corners are balanced, and the results are added to the DataX1 component. When "A" component is referred to in DataX2 ("C" component), "A" components adjoining vertically are balanced, and the results are added to the DataX2 component. When "A" component is referred to in DataX3 ("B" component), "A" components adjoining horizontally are balanced, and the results are added to the DataX3 component. This is true for interpolation of "B", "C" or "D". Although pixel array signals are inputted per line, in order to perform pixel interpolation of the DataX1 in FIG. 13, for example, it is required to refer to the lines in front of and behind the line of the DataX1. For this, an interpolation & gamma block 42 is provided with line buffers 61a and 61b that store two lines in front of and behind the line of a pixel to which pixel interpolation is conducted. While pixel interchange is made between the line buffers 61a, 61b and a 3×3 pixel register 62, the value of each pixel of the 3×3 pixel register 62 is selected on a color selection block 63, to perform pixel interpolation on the color selection block 63. That is, to the CCD 21 of four-color (2×2) system such as the complementary color type (YMCG system, etc.), all the same calculation is carried out to perform pixel interpolation, as the method shown in FIG. 13. With respect to an objective pixel present in the center of the 3×3 pixel register 62, a pixel reference block for making a reference to pixels surrounding the objected pixel is formed by the line buffers 61a, 61b and the 3×3 pixel register 62.

On the other hand, the three-color RGB-Bayer employs "G" component again as a fourth color component, in addition to three colors of "R", "G" and "B". With this configuration, a CCD 21 of RGB-Bayer can perform real time processing of both three-color system and four-color system on the same circuit, by replacing part of color selection blocks (namely, the fourth color one). When color interpolation processing is conducted about the RGB-Bayer of three-color system, there is needed processing different from that in complementary color type of four-color system (YMCG system, etc.). That is, in the color interpolation processing for complementary color type (YMCG system, etc.) of four-color system, the processing as shown in FIG. 13 can be performed for all pixels. In color interpolation processing to "G" of the RGB-Bayer of three-color system, when for example "G" is interpolated for both "R" and "B" in FIG. 10, since there are present "G" adjoining in the four directions of both longitudinal and transverse directions, color interpolation may be carried out based on these "G" (a first interpolation method). Alternatively, from "G" of four pixels adjoining in the four directions of both longitudinal and transverse directions, the minimum and maximum value ones are removed and the mean value of the remaining two pixels' "G" is obtained (a second interpolation method). In practice, it is configured so that the first and second interpolation methods can be selected arbitrarily by setting of a driver software program for driving a color selection block 63, or the like. This enables to sharply increase the degree of freedom of engineering change. On the other hand, for "G", all required is to interpolate "R" adjoining vertically, and "B." adjoining transversely, and there is no need to interpolate other "G" in all corners. This processing is distinctly different from that shown in FIG. 13.

Alternatively, in the RGB-Bayer, either of the two "G" within the border of heavy line in FIG. 10, is utilizable in a dummy fashion as an overall brightness component or intensifying component of the corresponding part's pixel. That is, it is utilizable as a "feature data (KEY signal)" that shows a predetermined feature such as a brightness component or intensifying component of each pixel, without extracting it as a color component of each pixel.

For instance, a 32-bit signal obtained by adding a KEY signal of 8-bit, to "R", "G" and "B", each having a 8-bit, is disposed on a 3×3 pixel register 62 in FIG. 14, as a four-color signal, so that it is used as a "feature data (described later)" per pixel, in processing steps on the respective blocks 43, 44 and 45 of a real time processing unit 23.

Also, in the complementary color type of four-color system (YMCG, etc.), "G" is utilizable in a dummy fashion as an overall brightness component or intensifying component of the corresponding part's pixel. That is, it is utilizable as a "feature data (described later)" that shows a predetermined feature such as a brightness component or intensifying component of each pixel, without extracting it as a color component of each pixel.

In general, when a three-color system processing is carried out on a processing circuit capable of handling three-color and four-color system processing, it can be considered a method of filling and storing three-color data on a predetermined memory, or performing processing while ignoring the fourth color data. However, particularly in the later method, there is the problem that memory and a processing circuit cannot be utilized effectively.

On the other hand, in the digital still camera of this embodiment, when a three-color data is stored in a memory location for four-color processing in the main memory 29, each pixel is stored in a region corresponding to the forth color, such as to be utilized as a "feature data (KEY signal, e.g., "G") described later, which is used for a predetermined featuring pixel by pixel in software processing on a color space transformation & false color suppression block 43 as described later, and a CPU 24. By employing pixel interpolation of the fourth color during processing in the real time processing unit 23, various nonlinear processing and pixel unit processing on the respective blocks 43, 44 and 45 can be carried out at an extremely high speed.

Figure 14:
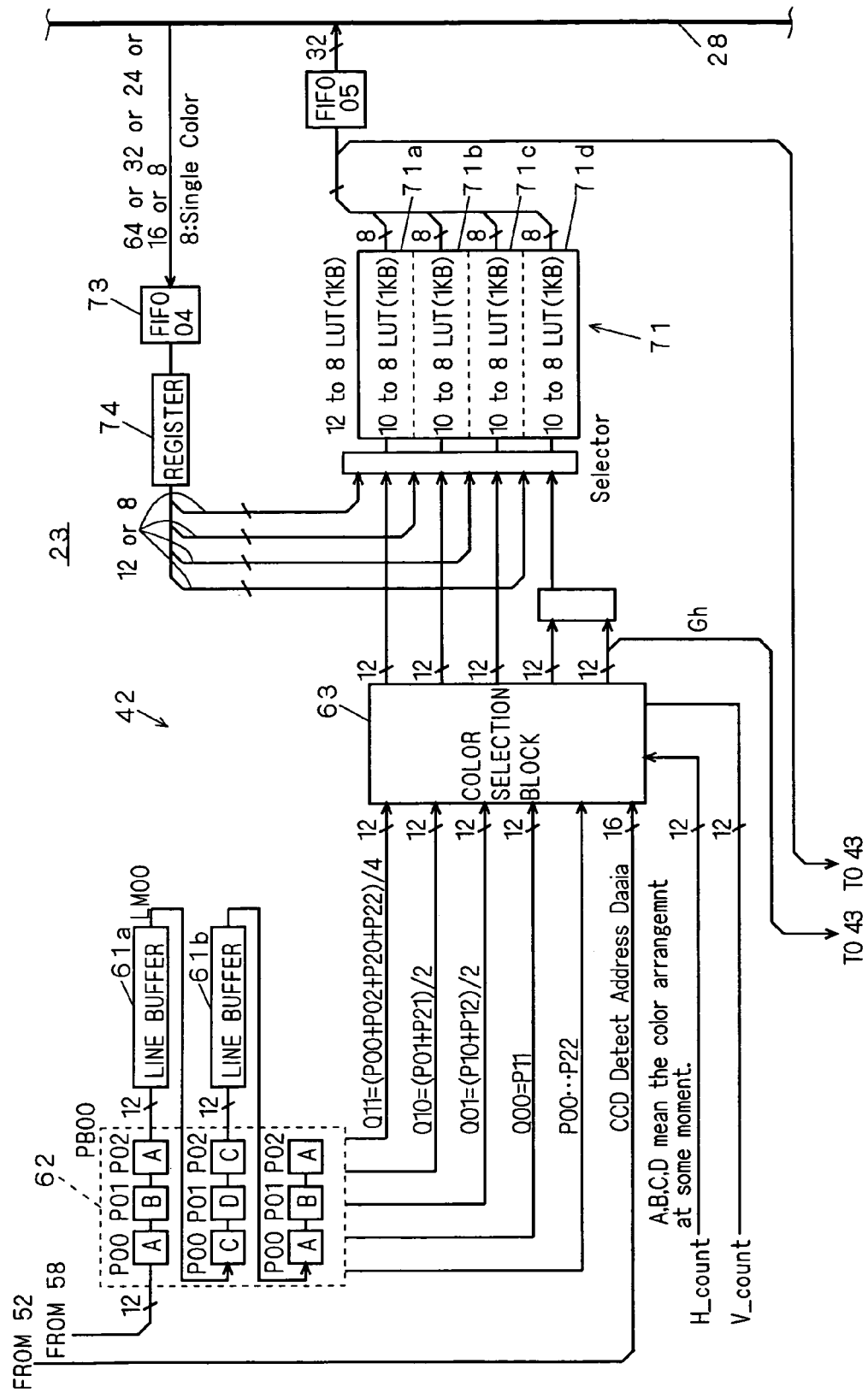
FIG. 14 is block diagram illustrating the internal construction of a pixel interpolation & gamma block in the real time processing unit.

In the mentioned color interpolation processing, as shown in FIG. 14, pixel interpolation of each pixel data outputted from a limiter 58 of a single pixel processing block 41 is conducted as follows. Each color component is disposed on the 3×3 pixel register 62 by using the line buffers 61a and 61b as described above, and balancing processing is carried out while selecting these color component signals on the color selection block 63, according to H_Count signal based on horizontal synchronizing signal, and V_Count signal based on vertical synchronizing signal. It is therefore possible to use as a "feature data (described later)" per pixel, in the processing steps on the respective blocks 43, 44 and 45 of the subsequent stage of the real time processing unit 23.

As stated above, since in the interpolation & gamma block 42, processing of a three-color system such as RGB-Bayer can be handled by replacing part of color selection blocks (namely, the fourth color one), real time processing of both three-color system and four-color system can be carried out on the same circuit. This enables to considerably reduce circuit size and suppress power consumption, as compared to a conventional one in which a pixel interpolation circuit for RGB and a pixel interpolation circuit for complementary color (four-color system) are disposed apart independently. Now considered the case where the CPU 24 performs the above processing based on a software program, image is stored temporarily in memory in frame units, and then color interpolation is made by performing vertical and transverse balancing processing per pixel in the image. Accordingly, if this is done for all pixels, there are needed a tremendous volume of processing steps and a considerable period of time. Whereas this embodiment can speed up processing sharply because of real time processing in the real time processing unit 23.

Figure 15:
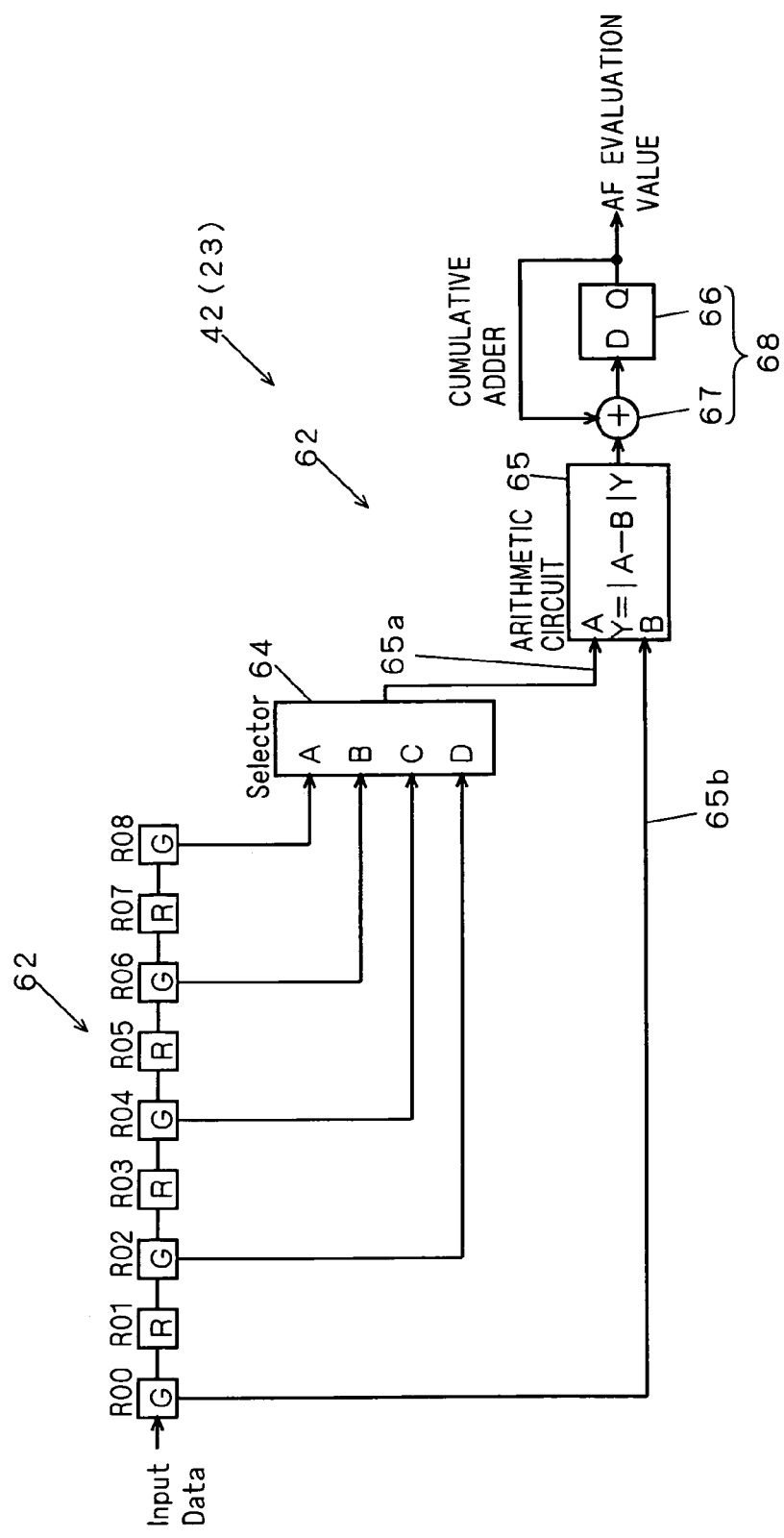
FIG. 15 is a block diagram illustrating an AF evaluation function in the pixel interpolation & gamma block.

Note that the color selection block 63 of the interpolation & gamma block 42 is provided with an AF (auto focusing) evaluation function by which high frequency component (Gh signal) is extracted and, based on this, high frequency component evaluation (AF evaluation) for AF is performed. FIG. 15 gives a block diagram illustrating a state of AF evaluation made by extracting part of a timing data ("G" signal) presented in a pixel array at some instant, in the function with which the evaluation value of a high frequency component for AF evaluation (namely, high frequency component evaluation value) is created based on Gh signal in RGB-Bayer. The AF evaluation is performed by detecting whether an edge appears clearly at that instant. Usually the best AF evaluation value is obtainable by extracting the level of a high frequency component alone by FFT (fast Fourier transform) or the like, followed by judgement based on the extracted value. It is however extremely difficult to perform FFT processing under the circumstance that an input data is inputted one after another in the real time processing unit 23. Also, it is insufficient to store image frame by frame in the main memory 29, and perform FFT processing by software processing in the CPU 24, because processing is complicated and a tremendous time is needed. From the reason for this, an AF evaluation is made in the following manner. Pixels corresponding to the adjoining same color components are selectively extracted by a selector 64, and the absolute value of a difference in pixel between the extracted same color components is obtained on an arithmetic circuit 65. Absolute values to be obtained continuously in such a series of processing are integrated by a cumulative adder 68 serving as a feedback circuit formed by a buffer 66 and adder 67, and the maximum point of variations (differential values) of the integral values (cumulative values). That is, the selector 64, arithmetic circuit 65 and cumulative adder 68 forms an auto focus evaluation block to output evaluation values of high frequency components for auto focusing.

In an auto focus evaluation block of the color selection block 63, an AF evaluation to an input data is performed by using "G" component that is present most frequently as a color component of an identical color in RGB-Bayer. The color selection block 63 is especially characterized in that the selector 64 selects arbitrarily, as a difference extraction object of the "G" component's value, the value of the nearest "G" component or the value of other "G" component apart therefrom. Specifically, in some cases, "G" signal inputted to a D input terminal of the selector 64 is selected as "G" signal nearest to "G" signal (objective pixel) inputted to one B input terminal 65b of the arithmetic circuit 65. In some cases, "G" signal inputted to an A input terminal of the selector 64 is selected as "G" signal farthest to "G" signal being objective pixel that is inputted to the other B input terminal 65b of the arithmetic circuit 65. In some cases, "G" signal inputted to a B or C input terminal of the selector 64 is selected to calculate a difference with "G" signal of an objective pixel. Thus, the selector 64 cam change the distance from an objective pixel, to obtain a difference value, thereby making it easy to change a targeted frequency in an AF evaluation. This is because the frequency at which human beings feel image comes to a focus by the naked eye is not always the maximum frequency of adjacent pixel levels, and they feel it is sufficiently in focus even if image is brought into focus based on pixels spaced about two to four pixels apart. On the other hand, when some noise occurs in a pixel, tat is, a change appears in the pixels photographed by a CCD 21, or noise is mixed into a condenser in the course of signal output therefrom, there is a large change in adjacent pixel units, in most cases. Therefore, it is taken into consideration that when a difference is obtained by an adjacent pixel alone, an AF evaluation results in overvaluation due to the noise. That is, by changing a targeted frequency in AF evaluation at the selector 64, focusing fit for the naked eye is achievable by reducing the influence of noise. Selection made by the selector 64 may be changed depending on characteristics, e.g., pixel pitch, of an actual CCD 21. Even if the same object or scenery is photographed, an adjacent objected pixel pitch changes depending on the characteristics, e.g., pixel pitch, of the CCD 21. Therefore, by changing a targeted frequency at the selector 64, according to the characteristic such a pixel pitch of the CCD 21, the precision of the AF evaluation can be maintained in a certain level. A single real time processing unit 23 can cope with any CCD 21 of various characteristic.

The color selection block 63 of the interpolation & gamma block 42 is also provided with a defective pixel compensation function with which defective pixels of the CCD 21 are compensated.

Usually in the defective pixel compensation of a CCD 21, when input containing a defective pixel per pixel is directly used, the resulting image is unnatural. In this connection, there is a method of performing pixel interpolation by using the preceding input color data that is regarded to be the same color component as the defective pixel (for example, in FIG. 15, since a pixel of the same color component is inputted alternately, the color data of two pixels before serves as an object). In the usual CCD 21, about one million pixels are present in a frame. Therefore, if a defective pixel should occur, it is possible to obtain image sufficiently fit for the naked eye by performing pixel interpolation with the relatively simple method as described.

In this connection, according to a conventional defective pixel compensation in a CCD, compensation has been made by the following operation comprising: storing the vertical (V) and horizontal (H) address information of a defective pixel in a plurality of registers (corresponding to the sum of expected defective pixels) contained in a RPU (real time processing unit); generating a defective signal at a timing at which the address value matches the vertical (V) and horizontal (H) count values of a TG (timing generator) of the CCD; and replacing a pixel data corresponding to such a timing, with a peripheral pixel (it is usually the immediately preceding pixel of the same color).

With this conventional manner, however, it is necessary for the RPU to contain a number of registers sufficient for storing address data corresponding to the sum of expected defective pixels. The number of defective pixels tends to increase with increasing the number of pixels of CCD in recent years. This trend gradually increases the number of registers contained therein, thereby causing an increase in power consumption. Although the sum of defective pixels is usually estimated to be several to about twenty, it is not always within this range. Especially depending on a threshold value used for defective pixel evaluation, the number of pixels to be determined as a defective pixel may vary widely. Therefore, it is insufficient to regard that several to about twenty defectives are present per CCD. For instance, when about 1000 defective pixel are expected, it is necessary to provide about 1000 registers within a RPU, in accordance with the above conventional manner. This is unrealistic because of the limitation of circuit size. In most cases, the number of compensations per CCD has been limited to several to about twenty defective pixels.

Figure 16:
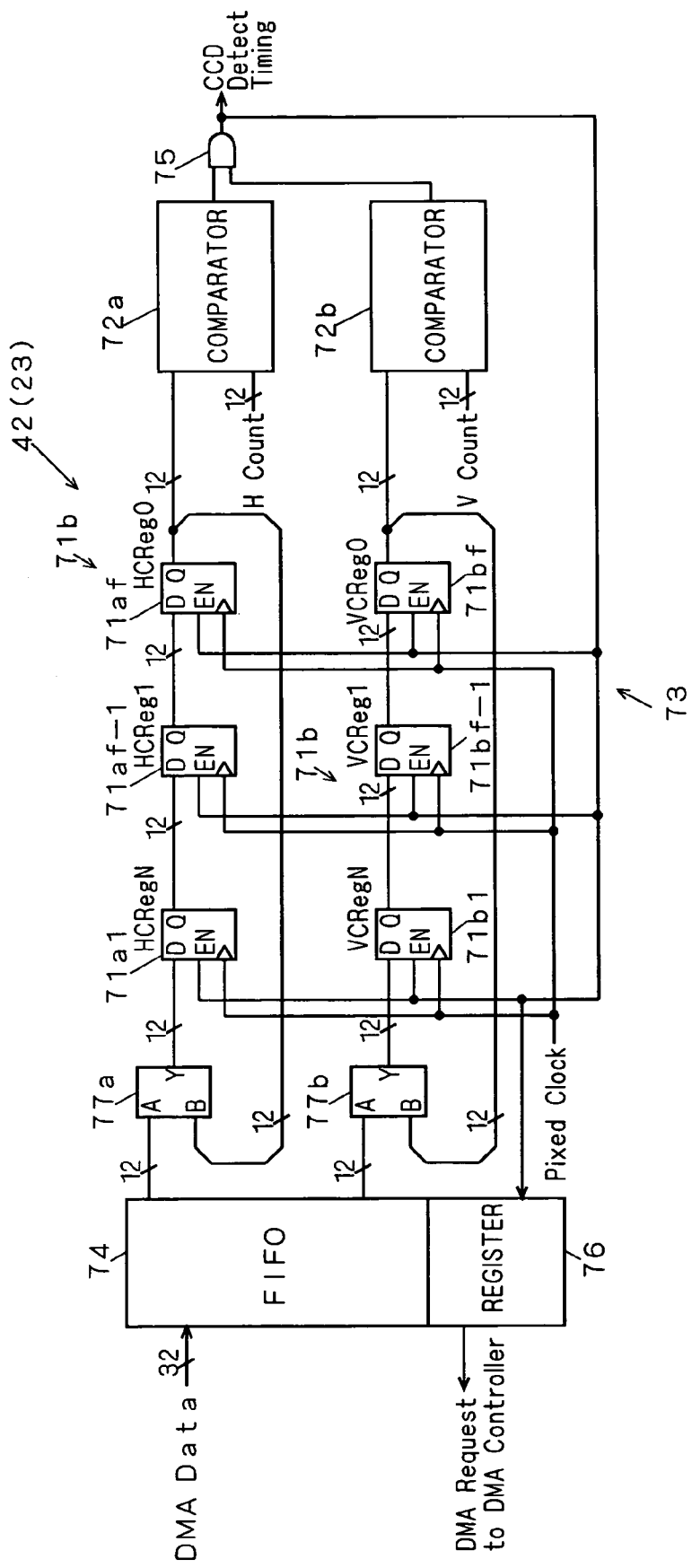
FIG. 16 is a block diagram illustrating a defective pixel compensation function in the pixel interpolation & gamma block.

On the other hand, the digital still camera of this embodiment performs defective pixel compensation of a CCD 21 by storing position information of a defective pixel of the CCD 21 on a main memory 29 in the order of time-position, and inputting, by direct memory access (DMA), the position information of the defective pixel in the main memory 29, to a defective pixel timing generating circuit 73 formed in combination of shift registers 71a, 71b and comparators (CMP) 72a, 72b, as shown in FIG. 16, in place of providing registers for storing defective pixel addresses in the real time processing unit 23. That is, the shift registers 71a, 71b and comparators (CMP) 72a, 72b form a defective pixel compensation block.

Specifically, defective pixel addresses of a CCD 21 are stored in an arbitrary storage region in the main memory 29 (see FIG. 1) in the order in which the defective pixels occurred, and then inputted, by direct memory access (DMA), to the respective shift registers 71a and 71b that are disposed in parallel relation within the defective pixel timing generating circuit 73 of the interpolation & gamma block 42, through a register (FIFO) 74 having a 1-word length. From the respective rearmost stage of the shift registers 71a and 71b, data is inputted to their respective comparators 72a and 72b, to make a comparison with the vertical (V) and horizontal (H) count values. This allows to perform compensation without imposing in practice any limitations on the number of defective pixels.

The shift register 71a and comparator 72a connected thereto are for recognizing the appearance timing (address) of a horizontal (H) defective pixel, and the shift register 71b and comparator 72b connected thereto are for recognizing the appearance timing (address) of a vertical (V) defective pixel.

The vertical (V) and horizontal (H) count values counted in the real time processing unit 23 have been inputted to the comparators 72a and 72b, respectively. When in the comparators 72a and 72b, it is judged that the output addresses of the rearmost stages (71af, 71bf) of the shift registers 71a and 71b are matched with the above vertical (V) and horizontal (H) count values, respectively, a defective pixel timing (CCD detect timing) signal is outputted through an AND circuit 75 and register (DMA req. trigger) 76.

At the same time, to the rearmost stage shift registers 71af (HCReg0) and 71bf (VCReg0), the values of the immediately preceding stage shift register 71af-1 (HCReg1) and 71bf-1 (VCReg1) are loaded respectively. To the foremost shift registers 71a1 (HCRegN) and 71b1 (VCRegN), a defective pixel address (DMA data) in the main memory 29 is loaded which has been obtained through a register (FIFO) 74 having one-word length disposed at the preceding stage.

Herein, when the register (FIFO) 74 alone is provided in order to receive a defective pixel address (DMA data) from the main memory 29, there are various changes in the step of rewriting the value of the register (FIFO) 74 to the value of a newly received defective pixel address (DMA data). In this step, if the value of the register 74 is happen to be instantly the same as vertical (V) and horizontal (H) count values, the comparators 72a and 72b might erroneously output a positive comparison result (namely, the problem of hazard occurrence).

However, such a hazard occurrence is solvable in this embodiment because the shift registers 71a and 71b are disposed between the register 74 and comparators 72a and 72b, respectively. Specifically, signals from the rearmost stage shift registers 71af and 71bf of the shift registers 71a and 71b are inputted to the comparators 72a and 72b, and the register 74 is not directly connected to the comparators 72a and 72b. Shift of the respective shift registers 71a and 71b will be only executed when a positive comparison result is obtained in the comparators 72a and 72b (i.e., when a matched signal is outputted), at a timing based on the output signals from the comparators 72a and 72b. Since data to be compared in the comparators 72a and 72b is always limited to that provided from the rearmost stage shift registers 71af and 71bf, whenever data of the register 74 is rewritten, there is no possibility that a matched signal is outputted from the comparators 72a and 72b, thereby overcoming the hazard problem.

At the time a load occurs from the shift register 74, according to a matched signal from the comparators 72a and 72b, a register (DMA req. trigger) 76 generates for a DMA controller 32 (see FIG. 1) a data transfer request about a defective pixel address (DMA data) in the main memory 29 (i.e., DMA request to DMA controller). In response to the request, an actual data transfer by DMA may be completed before the next defective pixel's timing. As an example which differs from that in FIG. 16, there is such a configuration that operation of the shift registers 71a1 to 71af-1 and 71b1 to 71bf-1, each being disposed in front of the rearmost shift registers 71af and 71bf, is controlled by a completion signal of data transfer by DMA. This produces some degree of temporal allowance for the actual data transfer by DMA.

When using no data transfer by DMA, it is possible to compensate defective pixels in the number of stages of the shift registers 71a and 71b, by providing input after the output data from the rearmost shift registers 71af and 71bf is switched to the foremost shift registers 71a1 and 71b1 by the selectors 77a and 77b, respectively.

In either case, address data is required to be arranged in order of occurrence, from the rearmost stage shift registers 71af and 71bf to the address data of the main memory 29.

With this configuration, a defective pixel compensation processing can be carried out easily even if the sum of defective pixels is, for example, as many as about 1000, by storing defective pixel addresses in the main memory 29 having a large capacity. In addition, because mere two internal registers 74 and 76 may be sufficient as shown in FIG. 16, circuit size can be reduced sharply, as compared to the case that the number of registers corresponding to the sum of expected defective pixels are contained in a RPU.

Note that the color selection block 63 of the interpolation & gamma block 42 effects output to the color space transformation & false color suppression block 43 by extracting only a high frequency component (Gh) of "G" signal.

Figure 17:
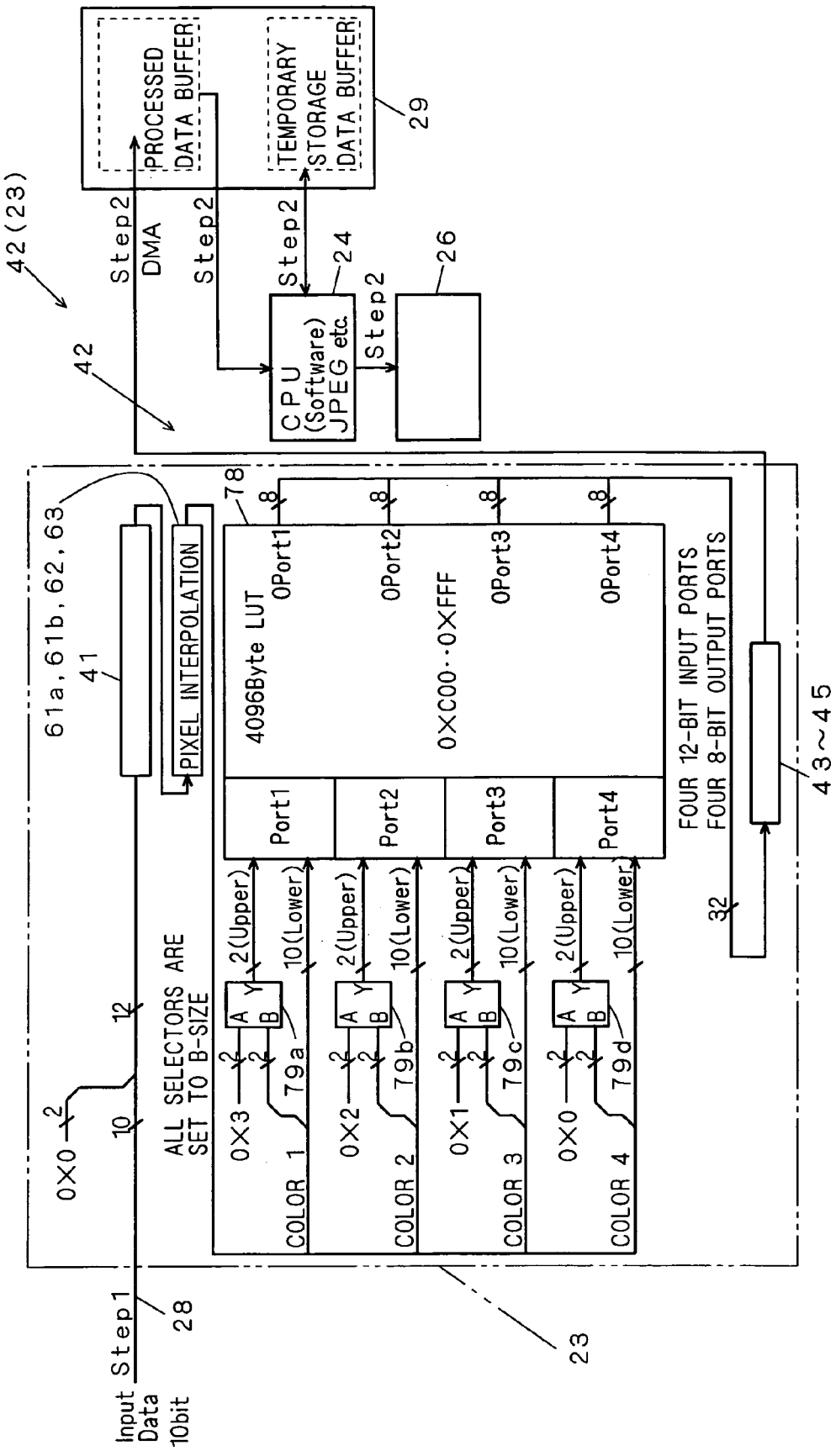
FIG. 17 is a block diagram illustrating a gamma compensation table in the pixel interpolation & gamma block.
Figure 18:
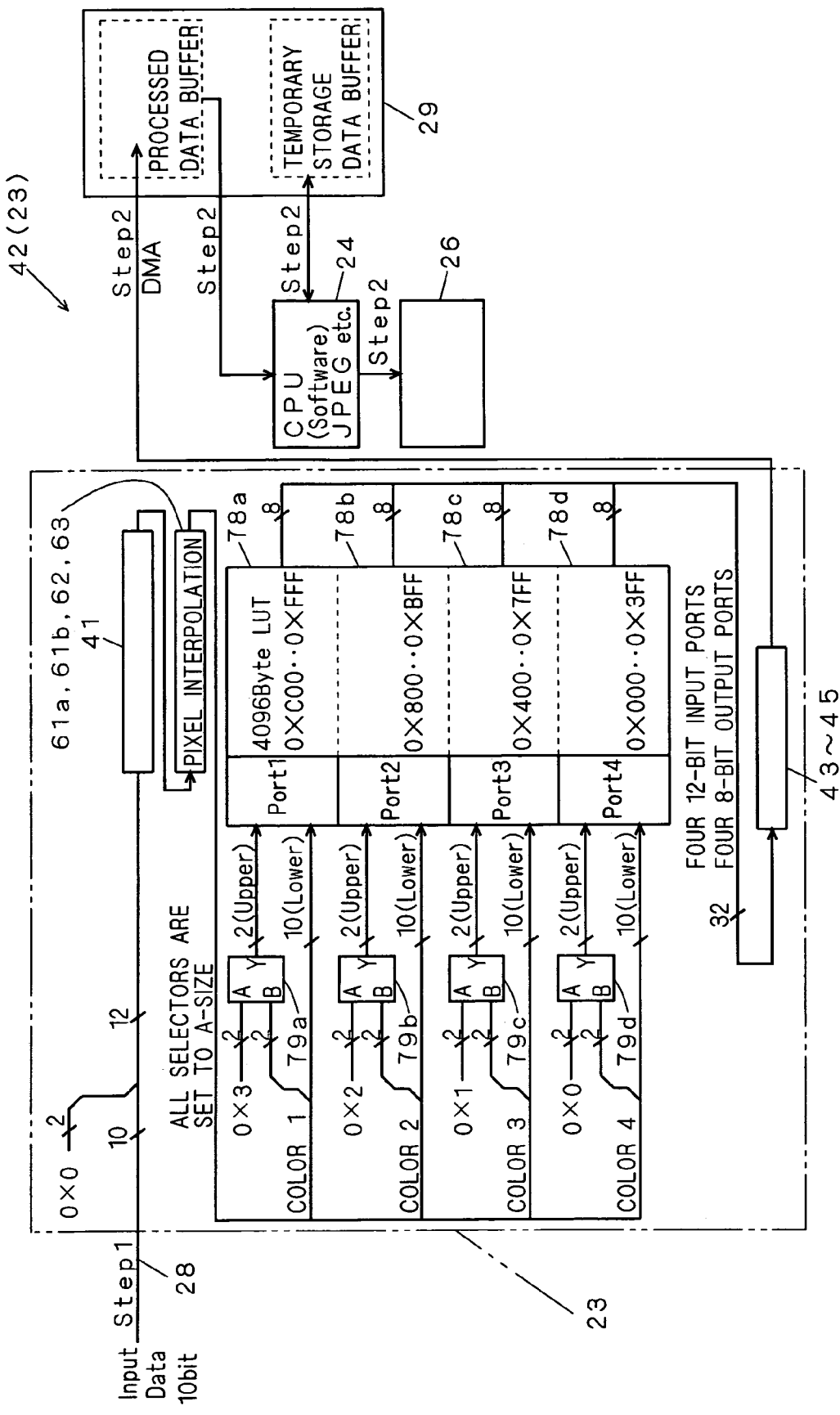
FIG. 18 is a block diagram illustrating a state that the gamma compensation table in the pixel interpolation & gamma block is divided into four look-up tables.

Description will now be made of gamma compensation function of the interpolation & gamma block 42. Referring to FIGS. 17 and 18, the block 42 employs a single gamma compensation table 78 (FIG. 17) in which an input data becomes a 12-bit signal, as 10-bit×4 ($=2^{12-1}10$) look-up tables 78a to 78d (FIG. 18) for gamma compensation.

That is, a CCD 21 after being subjected to A/D conversion on an analog signal processing circuit 22 moves to a single pixel processing block 41 and then subjected to pixel interpolation processing on the interpolation & gamma block 42, followed by the gamma compensation processing. When the input data provided for the gamma compensation processing is 12 bits in length, the gamma compensation table 78 can function as a 8-bit output one whose memory size is 4096 bytes, with respect to the signals inputted in 12 bits in length. When an input data is 10 bits, the gamma compensation table 78 can function as a look-up table (LUT) functioning as four look-up tables for gamma compensation, which handles a 10-bit input and 8-bit output independently per color of the input data.

Upon completion of pixel interpolation processing of the preceding stage, for four-color system pixel data, four-color input data are provided at a time. Therefore, there are provided four input ports Iport1 to Iport4 as an input port of the gamma compensation table 78. Correspondingly, the output port of the gamma compensation table 78 are provided with four output ports OPort1 to OPort 4.

In general, for an input data of a 12-bit length, it is required that a look-up table 78 be of a 12-bits length. In the meantime, because a look-up table 78 for converting input data having a 12-bit length to output signals having a 8-bit length cannot remove nonlinearity per color, only one kind may be defined per color. Accordingly, for handling a pixel data of four-color system, it is desirable to contain four look-up tables having a 12-bit length. However, this quadruples circuit size which can cause power consumption problem.

Meanwhile, input data having a 12-bit length is not always required, and input data having a 10-bit length may be applied in some cases. In such a case, if data is handled in the same manner as in an input data having a 12-bit length, there may occur excess bits, resulting in insufficient handling.

In view of the foregoing, the digital still camera of this embodiment has the feature that in handling input data having a 12-bit length, the look-up table 78 operates as a single 12-bit length look-up table, and in handling input data having a 10-bit length, four look-up tables 78a to 78d independently from one another can be used.

Specifically, as a memory size, a 4096-byte look-up table 78 is previously designed such as to be divided into four 1024-byte look-up tables 78a to 78d. At the input side of the respective look-up tables 78a to 78d, there are formed an upper input terminal of upper two bits and a lower input terminal of lower ten bits, and connection is made such that output signals from selectors 79a to 79d are inputted to the upper input terminal of upper two bits. Port number (0×0 to 0×3) (A input terminal) of the respective look-up tables 78a to 78d and the value of upper two bits of input data (B input terminal) can be selected at each of the selectors 79a and 79b. When input data having a 12-bit length is handled, the selectors 79a to 79d are switched to the B input terminal side (the value of upper two bits of an input data) by control switching executed by a CPU 24 or the like. When input data having a 10-bit length is handled, the selectors 79a to 79d are switched, in the same manner, to the A input terminal side (the port number (0×0 to 0×3) of the look-up tables 78a to 78d.

Thereby, when an input data having a 12-bit length is handled, the selectors 79a to 79d perform switching to the B input terminal side, so that the value of upper two bits of the input data is inputted to the upper input terminal of upper two bits on the respective look-up tables 78a to 78d, and the value of lower ten bits of the input data is directly inputted to the lower input terminal of lower ten bits on the respective look-up tables 78a to 78d.

On the other hand, when an input data having a 10-bit length is handled, the selectors 79a to 79d make switching to the A input terminal side, so that the port number (0×0 to 0×3) of the respective look-up tables 78a to 78d of the input data are inputted to the upper input terminal of upper two bits of the respective look-up tables 78a to 78d, and the value of lower ten bits of the input data is directly inputted to the lower input terminal of lower ten bits on the respective look-up tables 78a to 78d.

Thereby, when an input data having a 10-bit length is handled, the look-up tables 78a to 78d having a 10-bit length (1024 bits), can be defined arbitrarily and independently from one another, for all four colors.

As to an input data in the gamma compensation processing, as shown in FIG. 14, the pixel data stored in the main memory 29 is inputted to the selectors 79a to 79d, through a FIFO 73 and color over sampling module 74. Thus, processing similar to real time gamma compensation processing as described can be performed anytime with respect to image temporarily stored in the main memory 29 (namely, post processing).

When such a gamma compensation processing is performed at the step prior to the mentioned pixel interpolation processing, only a single input port and a single output port may be provided. A selector (not shown) may be provided to the input port and output port, so that the selector splits data into four colors, so as to be inputted/outputted to four look-up tables 78a to 78d. Here again, the structure of the look-up table 78 (78a to 78d) in itself is the same as that shown in FIGS. 17 and 18.

The foregoing description has been made of the look-up table capable of coping with both 12-bit and 10-bit length input data, without limitation. In general, when an input data has an N-bit length, the look-up table may function as a gamma compensation table 78 that handles the N-bit length data. When an input data has a (N-2)-bit length, it may function as four ($=2^{N-(N-2)}$) look-up tables 78a to 78d for gamma compensation. The same look-up table 78 (78a to 78d) can be utilized effectively according to the bit length of input data, without causing any excess bits.

Configuration and Operation of Color Space Transformation & False Color Suppression Block 43

The color space transformation & false color suppression block 43 has a color space transformation function of transforming a pixel data of a three-color system RGB-Bayer or four-color system complementary color type, into a predetermined color space, e.g., YCrCb, and also a color suppression function of performing color suppression (chroma suppression: false color prevention) of light and dark parts in image.

The color space transformation function of the color space transformation & false color suppression block 43 is to transform a pixel data of a three-color system RGB-Bayer or four-color system complementary color type (YMCG system, etc.), into a predetermined color space, e.g., YCrCb. The block 43 is characterized in that both three-color and four-color system processing can be handled, and that the signal in the fourth color data region can be used as a "feature data (KEY signal)" of each pixel, when performing a three-color system processing.

For instance, in RGB-Bayer, a 32 (=8×4) bits length signal which is the sum of signals of "R", "G" and "B", each having a 8-bit length, and a 8-bit length signal as a "feature data", is stored in the main memory 29 as a four-color signal.

This "feature data" is used per pixel, as a "feature data" such as "intensifying component," at the processing step in the real time processing unit 23.

Usually, in a processing circuit capable of handling both three-color and four-color processing, it can be considered that a three-color system processing is conducted by filing and storing a three-color pixel data in a main memory, alternatively, by ignoring the fourth data. The latter has the problem that the main memory or processing circuit cannot be utilized effectively, as stated earlier. Hence, in the digital still camera of this embodiment, when a three-color system pixel data is stored in the main memory 29 handling four-color processing, a "feature data" featuring each pixel is stored together in a region corresponding to the fourth color. The feature data is thereafter used in some processing in the real time processing unit 23, alternatively, after a temporal storage in the main memory 29, it is utilized in software processing by a CPU 24. Thereby, various nonlinear type processing and pixel unit processing can be carried out very quickly.

Figure 19:
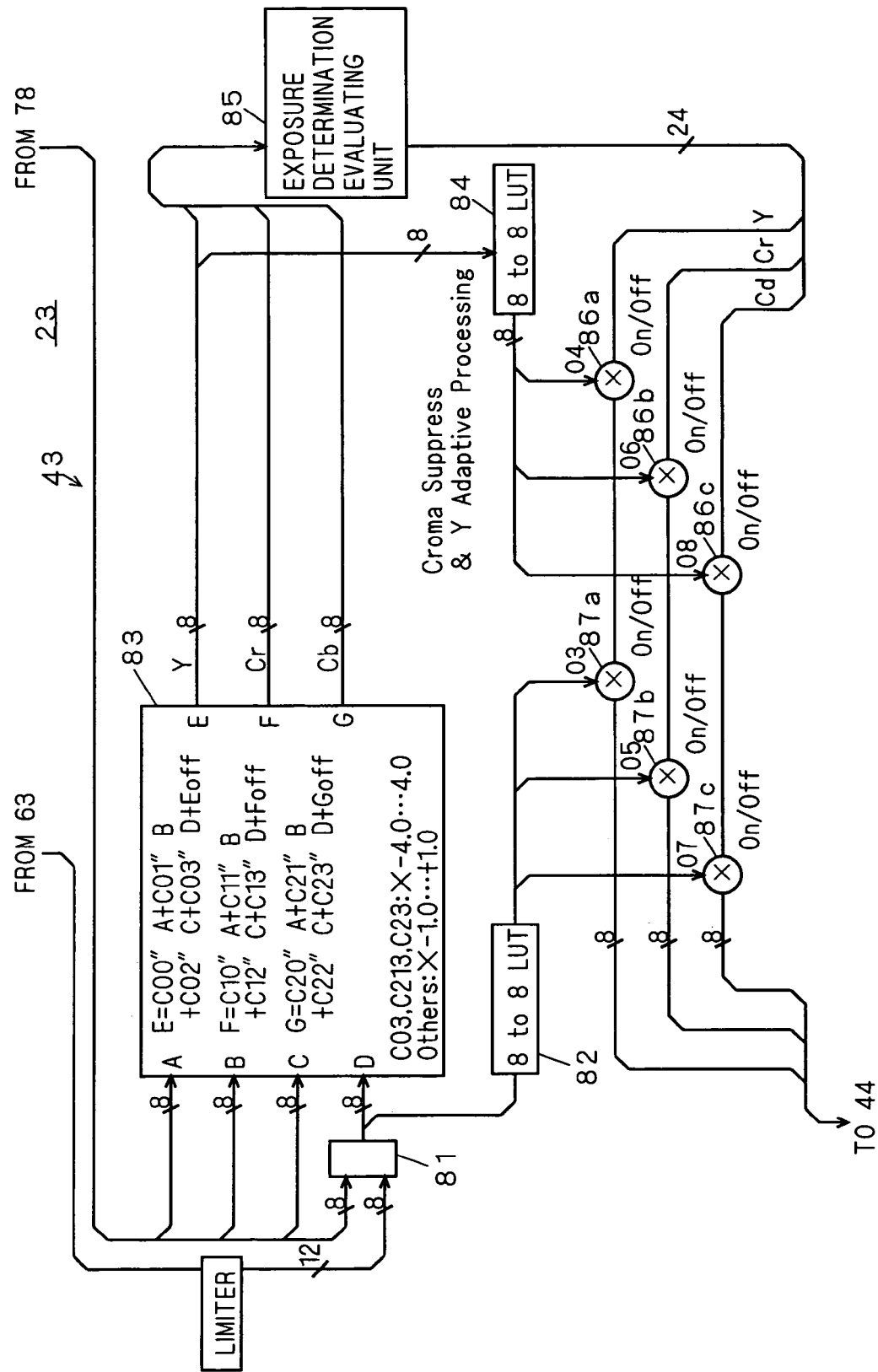
FIG. 19 is a block diagram illustrating a color space transformation & false color suppression block in the real time processing unit.

Referring to FIG. 19, the color space transformation & false color suppression block 43 comprises a selector 81, feature data look-up table (8 to 8 LUT) 82, color space transformation circuit 83, brightness look-up table (8 to 8 LUT 84, exposure determination evaluating unit (AE evaluation value detector) 85, three multipliers 86a to 86c, and three multipliers 87a to 87c. The selector 81 selects the fourth color component of a pixel data outputted from a gamma compensation table 78 of an interpolation & gamma block 42, and a high frequency component (Gh signal) of "G" signal outputted from a color selection block 63 of the interpolation & gamma block 42. The feature data look-up table 82 stores the data selected by the selector 81. The color space transformation circuit 83 performs transformation to a predetermined three-component color space having a brightness component such as YCrCb ("Y" component in a YCrCb space), based on the first to third color components of a pixel data outputted from the gamma compensation table 78, and the data selected by the selector 81. The brightness look-up table 84 is one to which only a brightness component ("Y" component") in a predetermined three-component color space, e.g., YCrCb, is inputted. The exposure determination evaluating unit 85 is one to which three components (e.g., "Y", "Cr" and "Cb") from the color space transformation circuit 83 are inputted, and from which an evaluation value for exposure determination (auto exposure) at the time of photographing by a CCD 21 is outputted, based on the three components. The multipliers 86a to 86c modulate the three components (e.g., "Y", "Cr" and "Cb") outputted from the exposure determination evaluating unit 85, by using a brightness data residing on the brightness look-up table 84. The multipliers 87a to 87c modulate three components (e.g., "Y", "Cr" and "Cb") passing through the respective multipliers 86a to 86c, by using a feature data transformed on the feature data look-up table 82.

Thus, the fourth color component selected by the selector 81 is inputted to the feature data look-up table 82, as a feature data. The use of this feature data facilitates each modulation for three pixel data. For example, there may be provided a predetermined spatial filter such as to extract a value targeted to a specific frequency (high frequency component, etc.), as a fourth color data. When the specific frequency value is greater than a threshold level, various exceptional mage processing such as color signal suppression can be conducted easily. Alternatively, although not shown in FIG. 19, it is facilitated that a feature data is multiplied by a predetermined factor, and the result is added to three pixel data by an adder. Again not shown in FIG. 19, it is possible to store a feature data (fourth color signal) in a main memory 29 through a main bus 28, in addition to three components of a pixel data (e.g., "Y", "Cr" and "Cb"). As to the feature data in the data temporarily stored in the main memory 29, various exceptional image processing can be carried out easily anytime. In this case, the feature data may be utilized in a software processing by the CPU 24. Alternatively, it may be temporarily stored in the main memory 29 as a fourth color data, and thereafter utilized in the real time processing unit 23.

Figure 20:
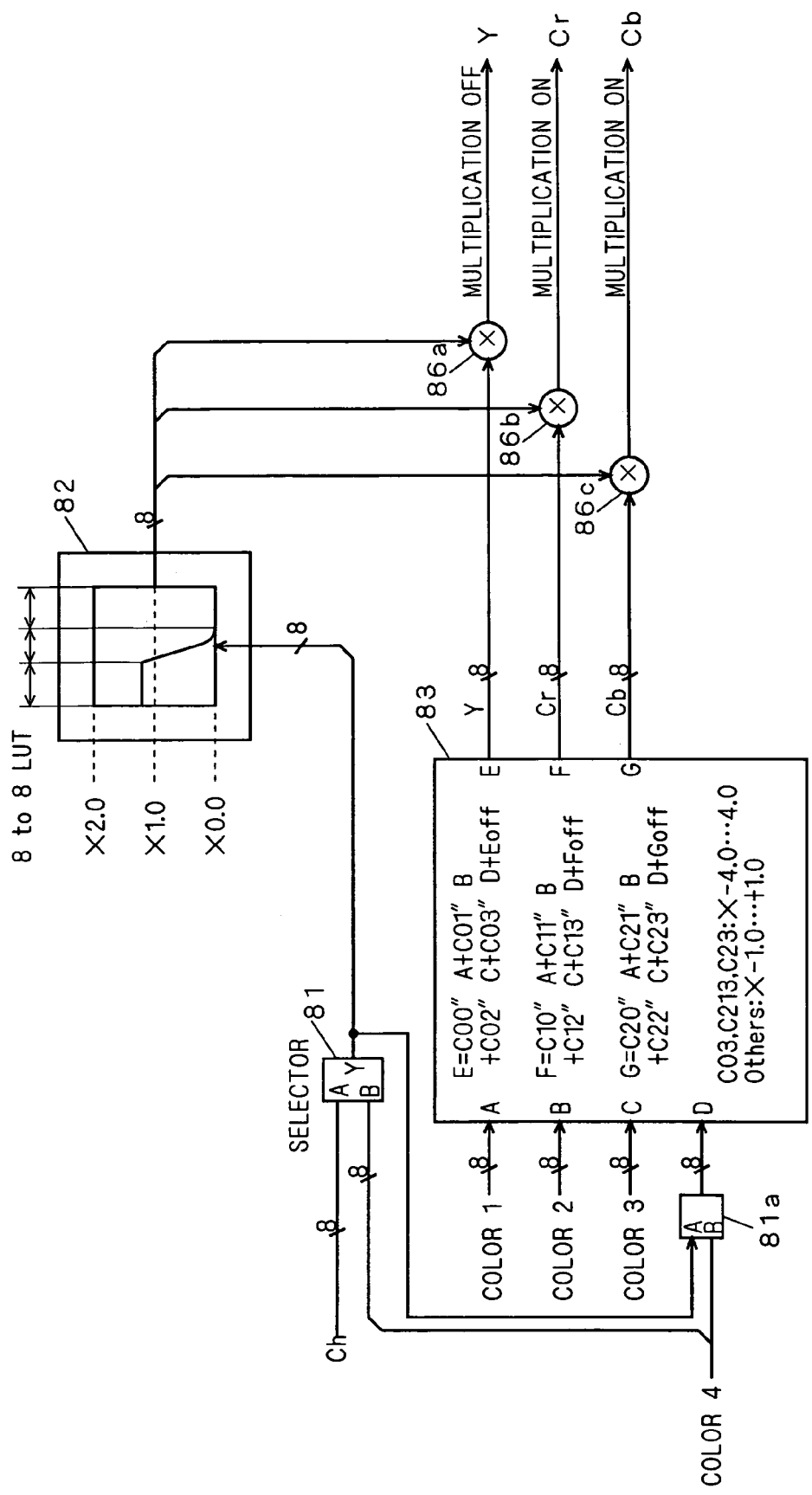
FIG. 20 is a block diagram illustrating a state that a predetermined processing such as chroma suppression is executed by selecting "Gh" signal and the fourth color signal.

Referring to FIG. 20, as described above, the fourth color signal ("color 4") of an input data from the gamma compensation table 78, and a high frequency component (Gh signal) of green (G) outputted from the color selection block 63, are inputted to the feature data look-up table 82 by selection operation of the selector 81, to determine whether each of three components (e.g., "Y", "Cr" and "Cb") outputted from the exposure determination evaluating unit 85 should be multiplied by output from the feature data look-up table 82. Therefore, the selector 81 can make selection such as to be suitable for optical characteristics of a CCD 21 to be equipped actually, so that processing such as modulation per pixel of "Y", or "Cr" and "Cb" in the mentioned post processing can be carried out at a high speed, without depending on software processing in the CPU 24.

In addition, "Gh" signal outputted from the color selection block (pixel interpolation block) 63 can be selected by the selector 81a and then inputted to the fourth color on the color space transformation circuit 83. Thereby, when performing data of three-color system pixel array, e.g., RGB-Bayer, "Gh" signal component can be added arbitrarily to each color component on the color space transformation circuit 83. Here, since green (G) pixel component is subjected to a 60% weighting in the step of generating "Y (brightness) (=0.6G+0.3R+0.1B)" signal, it has a high contribution ratio to brightness display. Also, "Gh" signal that is a high frequency signal of "G" component can be used directly as a high frequency component of "Y (brightness)" signal. It is therefore possible to add "Gh" signal easily to each color component. In the case of RGB-Bayer, when "Gh" signal component is added with a given factor to each of components "R", "G" and "B", as a kind of brightness characteristic, the brightness of each component can be adjusted easily.

Usually, for independent addition of a high frequency component, e.g., Gh, to "Y" signal, a multiplier for gain adjustment and an adder for making addition to "Y" signal are required independently, which causes an increase in circuit size. On the other hand, a color space transformation circuit capable of handling a four-color system processing always has the function of inputting four components. However, in data processing of three-color system pixel array sucj as RGB-Bayer, each fourth color factor is usually set to "0", namely, not used, resulting in an excess input terminal, which is inefficient. In view of this, according to this embodiment, "Gh" signal is selectively inputted by the selector 81, as a fourth color component. Thereby, even in data processing of a three-color system pixel array, e.g., RGB-Bayer, gain adjustment of "Gh" signal and addition to each color component are attainable without adding any multiplier and adder.

In the brightness look-up table (8 to 8 LUT) 84 of the color space transformation & false color suppression block 43, among color space region signals of "Y (brightness component)", "Cr (first color signal)" and "Cb (second color signal) which are outputted from the color space transformation circuit 83, only "Y" signal is inputted, and it is determined whether each of the components "Y", "Cr" and "Cb" from the exposure determination evaluating unit 85 should be multiplied by output of the block 84.

Particularly, when multiplication of "Cr" signal and "Cb" signal is turned on, and multiplication of "Y" signal is turned off, chroma suppression for dark and bright parts is attainable.

Figure 21:
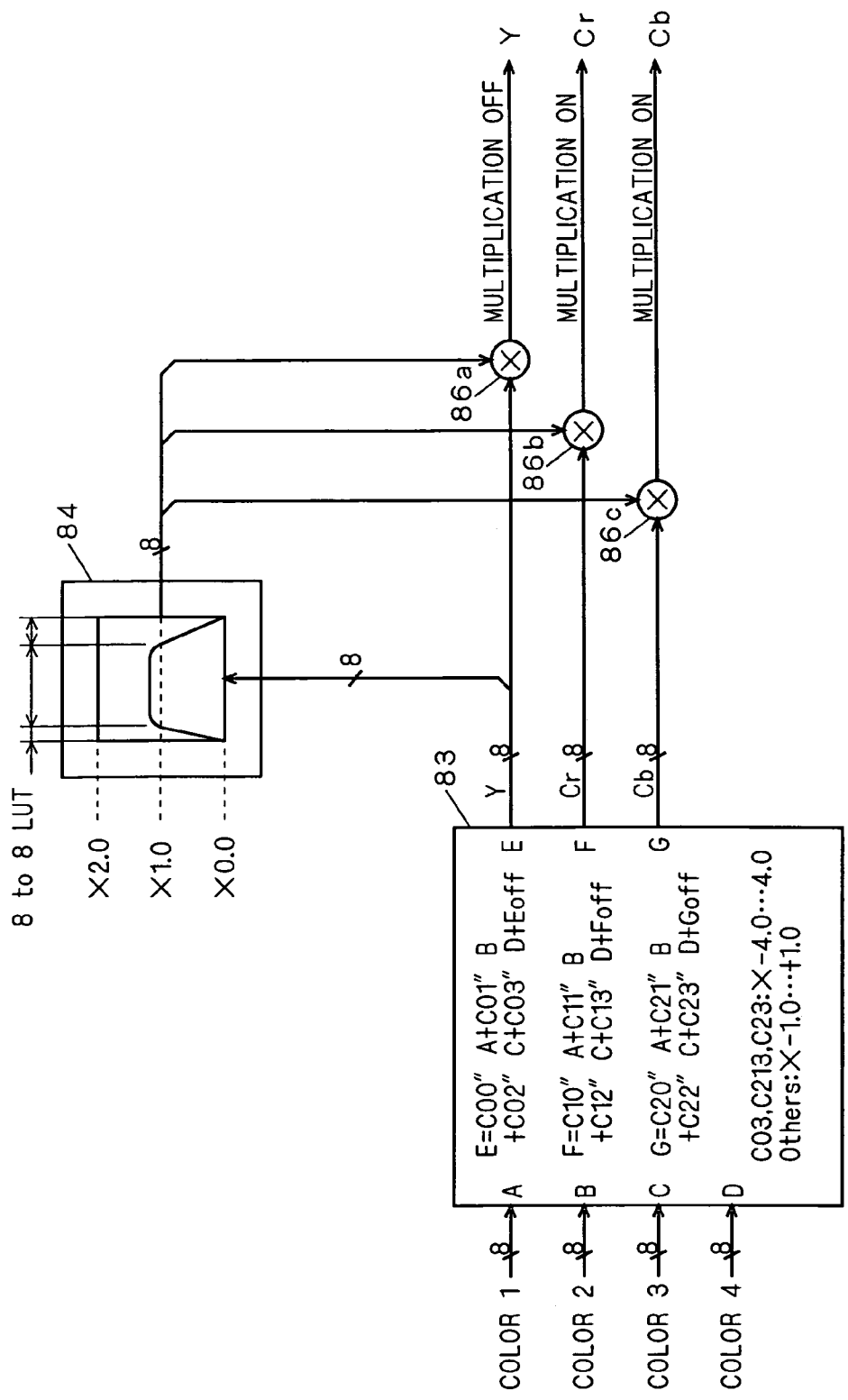
FIG. 21 is a block diagram illustrating operation in chroma suppression processing based on "Y" signal.

The dark part of image is usually susceptible to various noise influence. Therefore, natural image can be outputted by minimizing coloring in the dark part. On the other hand, the bright part of image is susceptible to modulation depending on characteristics of various hardware parts, e.g., the CCD 21 with which the image is photographed, and the bright part also tends to upset white balance. Thus, to minimize coloring in the bright part contributes to output of natural image quality. In view of these, the object of the chroma suppression function is to suppress coloring in both dark and bright parts of image. FIG. 21 is a block diagram illustrating an example of operation in chroma suppression processing. In FIG. 21, based on the respective arithmetic functions shown in the color space transformation circuit 83, the components of four colors of "color 1" to "color 4" are transformed to "Y", "Cr" and "Cb", respectively, and only "Y" signal is retained in the brightness look-up table 84, so that the respective multipliers 86a to 86c multiply "Cr" and "Cb" components other than "Y" component, by this "Y" signal.

In general, in chroma suppression processing, chroma suppression for the bright part of image can be conducted by employing an arithmetic circuit with which "Y" signal is compared with a fixed value, and the gradient of the "Y" signal is changed when it exceeds a certain level. In conducting chroma suppression for the dark part of image, a suppress circuit is usually added independently of the circuit for bright part. Unfortunately, in such a general manner, the number of circuits is increased and circuit configuration is complicated to increase cost, and areal efficiency of circuit is not high.

On the other hand, the digital still camera of this embodiment can perform independent multiplication of "Y" signal, "Cr" signal or "Cb" signal, because "Y" signal is inputted, as a 8-bit signal, to the brightness look-up table (8 to 8 LUT) 84, and then outputted as a 8-bit output signal therefrom. Thereby, chroma suppression for the dark and bright parts of image can be carried out on a single circuit.

Consider now such a chroma suppression that a high frequency signal such as Gh signal is compared with a predetermined threshold value, by software processing in a CPU 24, and chroma suppression is conducted when the high frequency signal exceeds the threshold value. In processing of the CPU 24, the method of chroma suppression is fixed, and there is the disadvantage that a region to be colored in a specific image fails to be colored. Such a problem is solved by conducting chroma suppression by software, however, its processing time is too long.

Whereas in this embodiment, image is temporarily stored in the main memory 29 and, after adding a feature data per pixel by the CPU 24, the image is stored in the main memory 29 and further subjected to processing in the real time processing unit 23. With this configuration, chroma suppression using Gh component and chroma suppression using a feature data signal generated by software can be used by real time processing, without lowering processing speed.

Figure 22:
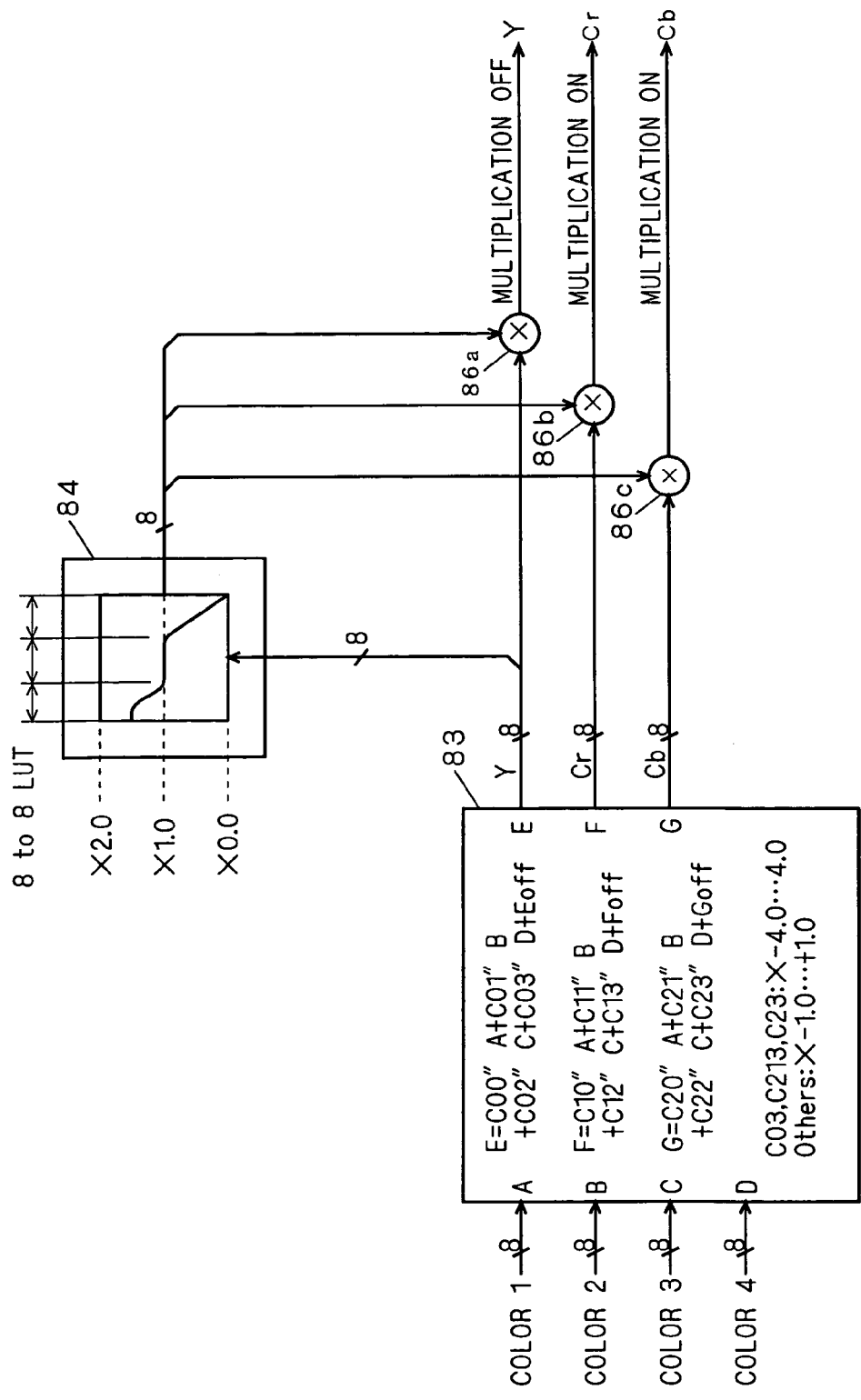
FIG. 22 is a block diagram illustrating operation in gamma transformation processing based on "Y" signal.

In addition, gamma transformation only to "Y" signal can be conducted by turning on only multiplication of "Y" signal inputted from the color space transformation circuit 83 (gamma transformation function). FIG. 22 is a block diagram illustrating operation in gamma transformation processing. In FIG. 22, based on the respective arithmetic formulas shown in the color space transformation circuit 83, the components of four colors of "color 1" to "color 4" are transformed to "Y", "Cr" and "Cb", respectively, and only "Y" signal is retained in the brightness look-up table 84, so that the respective multipliers 86a to 86c multiply all "Y", "Cr" and "Cb" components by this "Y" signal.

Since the mentioned gamma transformation processing and chroma suppression processing are carried out on the same circuit, circuit configuration may be extremely simple. Especially, when two brightness look-up tables (8 to 8 LUT) 84 are provided independently, both chroma suppression function and gamma transformation function can be performed at the same time. In a general real time processing unit provided with the two functions of "chroma suppression" and "gamma interpolation," there is the problem that these functions cannot be used at the same time. Whereas in the real time processing unit 23 of the digital still camera of this embodiment, a pixel data processed in the real time processing unit 23 is allowed to pass through the unit 23 over and over again by direct memory access (DMA), via the main memory 29 and main bus 28. Accordingly, by distributing each pixel data into other path, proceeding can be handled without causing any problems.

Although the foregoing description has been made of processing with respect to color space signals of "Y", "Cr" and "Cb", without limitation. With respect to color space signals completely different from these, the same processing can be performed by exceptional image processing.

The exposure determination evaluating unit 85 of the color space transformation & false color suppression block 43 determines an exposure level based on a proper brightness of an actual image data, as a prerequisite for determining shutter speed, aperture size, etc. That is, brightness evaluation for leveling the brightness between blocks is made by diving one frame image into a plurality of blocks.

Figure 23:
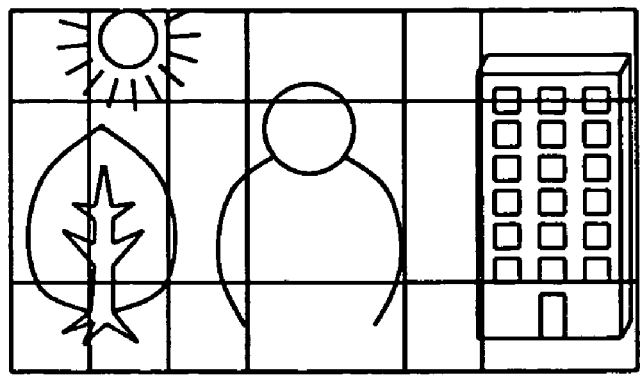
FIG. 23 is a diagram of a state that image is divided equally block by block.

Usually in evaluating exposure determination, there is a method of employing, as an evaluation value, a mean value of "Y (brightness)" signals (or "G (green component)" signals) of a rectangular region block in the center of a frame and its peripheral blocks (see FIG. 23, and referred to a first exposure determination evaluating method). In the normal way, a relatively restrict exposure determination is required for image residing in the central part because an object is projected therein. Whereas less strict exposure determination is usually required for the peripheral part than the central part, because its criticality in the image is expected to be low. In this case, the first exposure determination evaluating method is effective.

Figure 24:
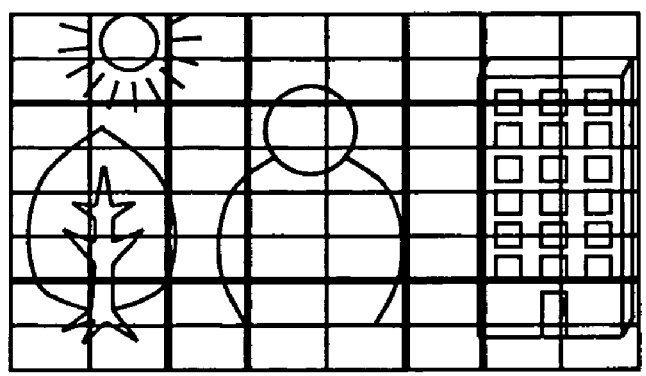
FIG. 24 is a diagram of a state that image is divided in an optimum size block by block.

Alternatively, there is a method of employing, as an evaluation value used in exposure determination, a mean value of "Y" signals (or "G" signals) of the respective blocks which are obtained by dividing equally the entire region, for example, 5×5, (see FIG. 24, referred to as a second exposure determination evaluating method).

With the first exposure determination evaluating method comprising leveling of the centrally located blocks and its peripheral blocks respectively, determination of central selective exposure and whole counter light correction are possible, however, it is difficult to use more fine exposure determination algorithms. With the second exposure determination evaluating method comprising dividing a block equally, a different block synthetic processing is required in determination of central selective exposure and determination of exposure on the spot, thus requiring much time for calculation. Also, there is the restriction that all blocks have the same area when setting block boundaries to an optimum position. To satisfy this restriction, the number of blocks to be divided is liable to increase. This can increase circuit size and increase power consumption, and much processing time is needed in evaluating exposure determination.

In view of these, with the exposure determination evaluating unit 85 of the digital still camera of this embodiment, when dividing a region into a plurality of blocks, the position of boundaries between blocks can be changed arbitrarily, as shown in FIGS. 23 and 24.

FIG. 23 gives the case where boundaries between the centrally located blocks and its peripheral blocks are set to an arbitrary position. FIG. 24 gives the case where all blocks are set to have the same area.

That is, a region for exposure determination is divided into at least 3×3 blocks or more, and each block's boundary position is free to move. For example, in FIG. 23, the boundary between blocks is set to a completely arbitrary position. In FIG. 24, by defining the borders of heavy line alone, equally spaced blocks are set as shown by the thin line. With these methods, an optimum block boundary can be selected by less number of blocks. This allows to increase precision of exposure determination while suppressing an increase in calculation time.

Specifically, in the exposure determination evaluating unit 85, an optimum boundary between blocks according to the optical characteristic of the CCD 21, is previously set to an arbitrary position by a driver software program for controlling drive to the real time processing unit 23, and the brightness values of "Y" signals or the like of all pixels are integrated block by block to be partitioned by the boundary. The integral values obtained per block are used as an object of evaluation. For example, hardware of the exposure determination evaluating unit 85 is formed by containing a counter, and adder, etc. Alternatively, some input button for mode switching is provided on the surface of a digital still camera unit, and a driver software program is set such that the boundary between blocks can be changed to one of some mode setting positions by the input button. Thus, depending on circumstances, an optimum exposure determination region can be selected by the user's intention.

Configuration and Operation of Spatial filter & Coring Block 44

Figure 25:
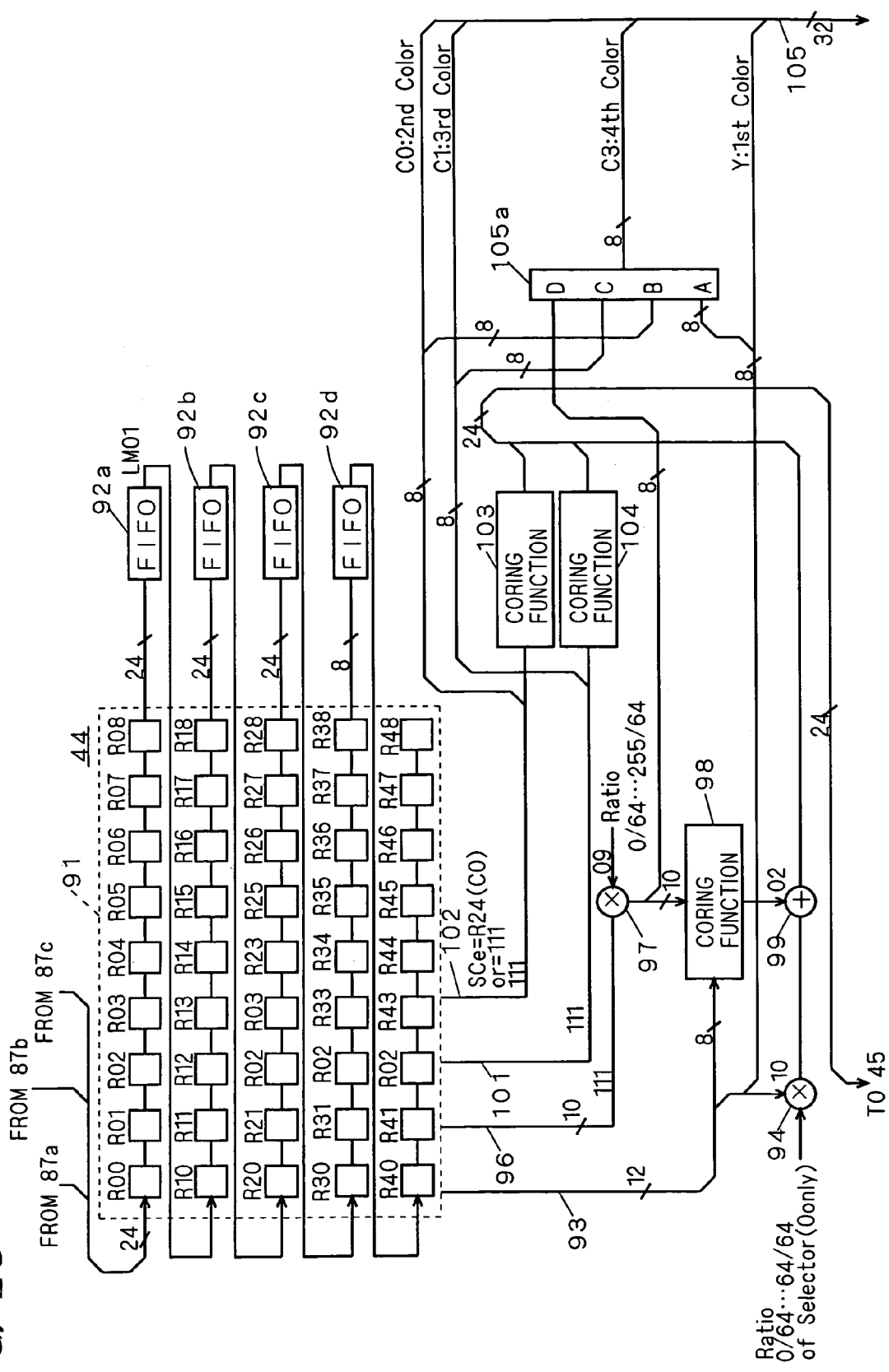
FIG. 25 is a block diagram illustrating the internal construction of a spatial filter & coring block in the digital still camera.

FIG. 25 is a block diagram illustrating the internal configuration of a spatial filter & coring block 44. In FIG. 25, color space signals ("Y", "Cr" and "Cb") from multipliers 87*a* to 87*c* of a color space transformation & false color suppression block 43 are stored by using a plurality of line memories (2048 variable length FIFO) 92*a* to 92*d*, and thereafter, a contour correction processing is carried out.

In conducting the contour correction processing, according to this embodiment, the respective component signals ("Y", "Cr" and "Cb") and high frequency component signals intensifying such signals can be handled separately, to reduce bit length of each data. The reason for this will be described herebelow.

The usual processing with a spatial filter has been made merely by passing a given spatial filter that can be set arbitrarily. With this manner, however, there are two problems as follows.

Figure 26:
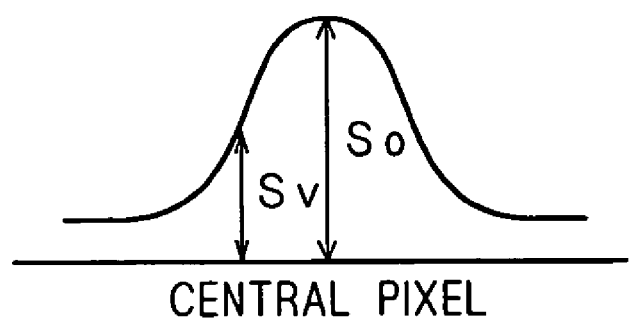
FIG. 26 is a luminance distribution chart of the image before contour correction processing.
Figure 27:
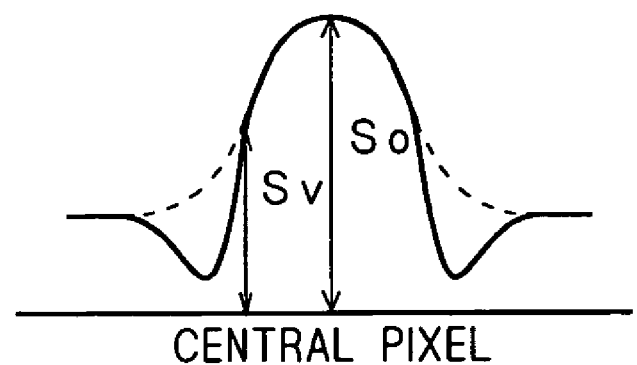
FIG. 27 is a luminance distribution chart of the image after contour correction processing.

Firstly, as shown in FIG. 26, when performing a general filter processing, an absolute value So of a central pixel factor is usually a large value, and an absolute value Sv decreases from the central pixel to its surroundings. The same is true for the data after contour correction processing (see FIG. 27). However, if desired to ensure versatility of a spatial filter, the bit length of the surrounding pixels cannot be reduced. Therefore, it is necessary to increase the bit length of all pixel factors such as to match the bit length of the central pixel, thus failing to effectively use a prepared bit length in most cases.

Whereas in this embodiment, output of a spatial filter 91 (FIG. 25) and the original data of the central pixel are respectively multiplied by a factor, followed by addition. Thereby, necessary and sufficient filter calculation is executable without increasing each pixel's bit length.

Specifically, in performing a contour correction for color space signals of "Y", "Cr" and "Cb", no contour correction is made for the color components of "Cr" and "Cb", and contour correction is made only for "Y" (brightness)" component, so that image contrast is sufficiently intensified to intensify the contour. That is, in FIG. 25, only "Y" component of the central pixel (R24) in the spatial filter 91 is taken through wiring 93, and then multiplied by a predetermined arbitrary factor (ratio) in a multiplier 94. The total value of all components of the central pixel (R24) being a 12-bit length in the spatial filter 91 is taken through wiring 96, then multiplied by a predetermined arbitrary factor (ratio) in a multiplier 97, and inputted to a first coring function block 98 performing nonlinear processing (coring). Thereafter, output from the first coring function block 98 (the total value of color line segments) and the "Y" component after being multiplied by the predetermined factor in the multiplier 94 are added by an adder 99, to obtain a contour intensifying value for the central pixel (R24). As to the color signals ("Cr" and "Cb") in themselves, these are taken through wirings 101 and 102, and then stored in second and third coring function blocks 103 and 104. Thereafter, they are sent to a resizing block 45, together with a contour intensifying value from the adder 99. These elements 94, 97 and 99 are named generically as a "contour correction block."

At the same time, the respective component signals ("Y (first color component)", "Cr (second color component)", and "Cb (third color component)") are set to the resizing block 45 through wiring 105. In order that any one of "Y" component, "Cr" component, "Cb" component, and an output value from the multiplier 97 (namely, an output value itself from the spatial filter 91) can be handled as a feature data (KEY signal), a selector 105*a* has the function of selecting and outputting it as a fourth color component.

Thus in this embodiment, output of a spatial filter 91 (FIG. 25) and the original data of the central pixel are multiplied by a factor in the multipliers 94 and 97, and then subjected to addition in the adder 99. Thereby, necessary and sufficient filter calculation is executable without increasing each pixel's bit length. There is also the feature that the original signal and a high frequency signal can be separated. Therefore, by conducting nonlinear calculation called "coring" to the high frequency signal, it is possible to perform contour intensification while suppressing an increase in noise.

As an alternative to the above method, color signals ("Cr" and "Cb") and a luminance signal ("Y") could be processed independently and then added to generate a video signal or the like. In this method, the luminance signal ("Y") is often subjected to gamma transformation after contour intensification. However, because signal processing of digital cameras employs 10-bit to 12-bit input signals, normally performed are to reduce memory capacity by conducting gamma transformation at the beginning of processing, for decreasing the bit length on memory; and to reduce circuit size by reducing the bit length in the course of digital processing. In this manner, a contour correction processing is required to be carried out after gamma transformation.

To extract the high frequency component of "Y" component, it could be usually performed only with a spatial filter 91 which is a high frequency filter. However, in performing contour intensification of 12-bit length elements (e.g., R24) in the spatial filter 91 by using the "Y" component, if noise is superposed on each element itself, there is the possibility that the noise component is also subjected to a contour intensification. If this is left as it is, the resulting image might be unnatural with much noise.

Accordingly, for contour intensification to the signal after gamma compensation, there is required nonlinear calculation (coring) in which a contour intensification is carried out only when a high frequency component exceeds a certain level. Here, if coring is conducted for the high frequency signal of "Y" component after gamma transformation, a low luminance region has a relatively large amplitude. As a result, it is liable that a strong contour intensification is provided by the high frequency component in the low luminance region. As a matter of fact, there are present a large number of signals requiring intensification, from the middle luminance range to high luminance range, and the high frequency component of the low luminance range are mostly occupied by noise. Therefore, the use of the spatial filter 91 in contour intensification or the like, will cause the problem that due to linear operation to all frequency components, small level noise in image having much noise is amplified. That is, only noise is intensified and the signal requiring intensification is not intensified, so that the resulting image cannot be seen clearly.

This noise has usually less contrast but appears in an extremely small form, and thus is often localized to a high frequency component. To this end, in the digital still camera of this embodiment, it is desirable to directly use a base signal in order to minimize intensification processing to part having less contrast, and also to positively conduct intensification processing when contrast exceeds a certain level. Specifically, in the first coring function 98, as indicated by nonlinear operation function within the boarder designated by numeral reference 98 in FIGS. 28 and 29, a nonlinear output value is outputted to an input value, and particularly, the part of which absolute value is smaller than a predetermined threshold value $\alpha$ is ignored. Thereby, no strong intensification is applied to the low luminance range whereas strong intensification is applied to the middle and high luminance ranges. Accordingly, image can be corrected to obtain a sharp image with noise components removed.

Figure 28:
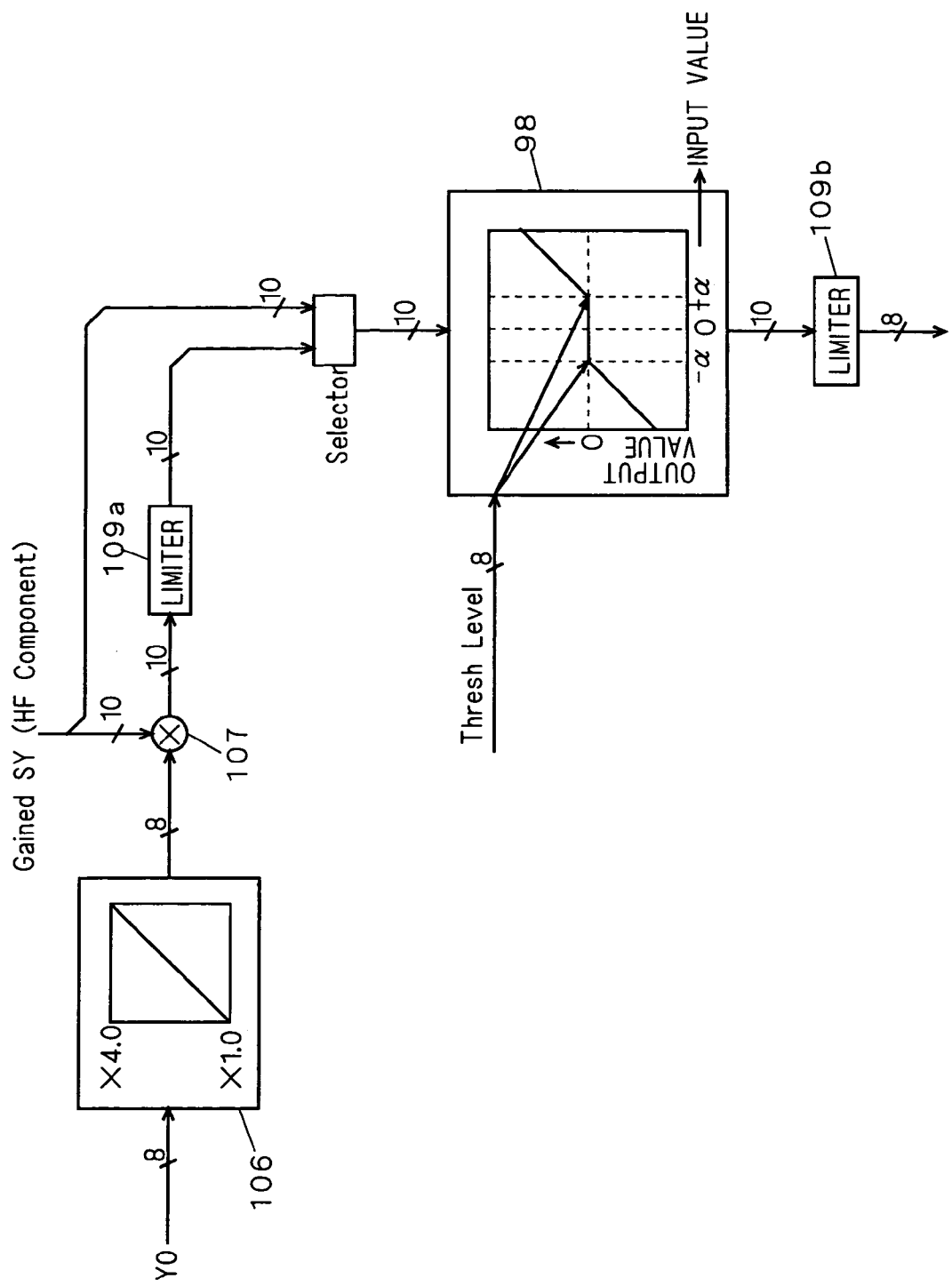
FIGS. 28 and 29 are block diagrams illustrating modulation function of a coring function.
Figure 29:
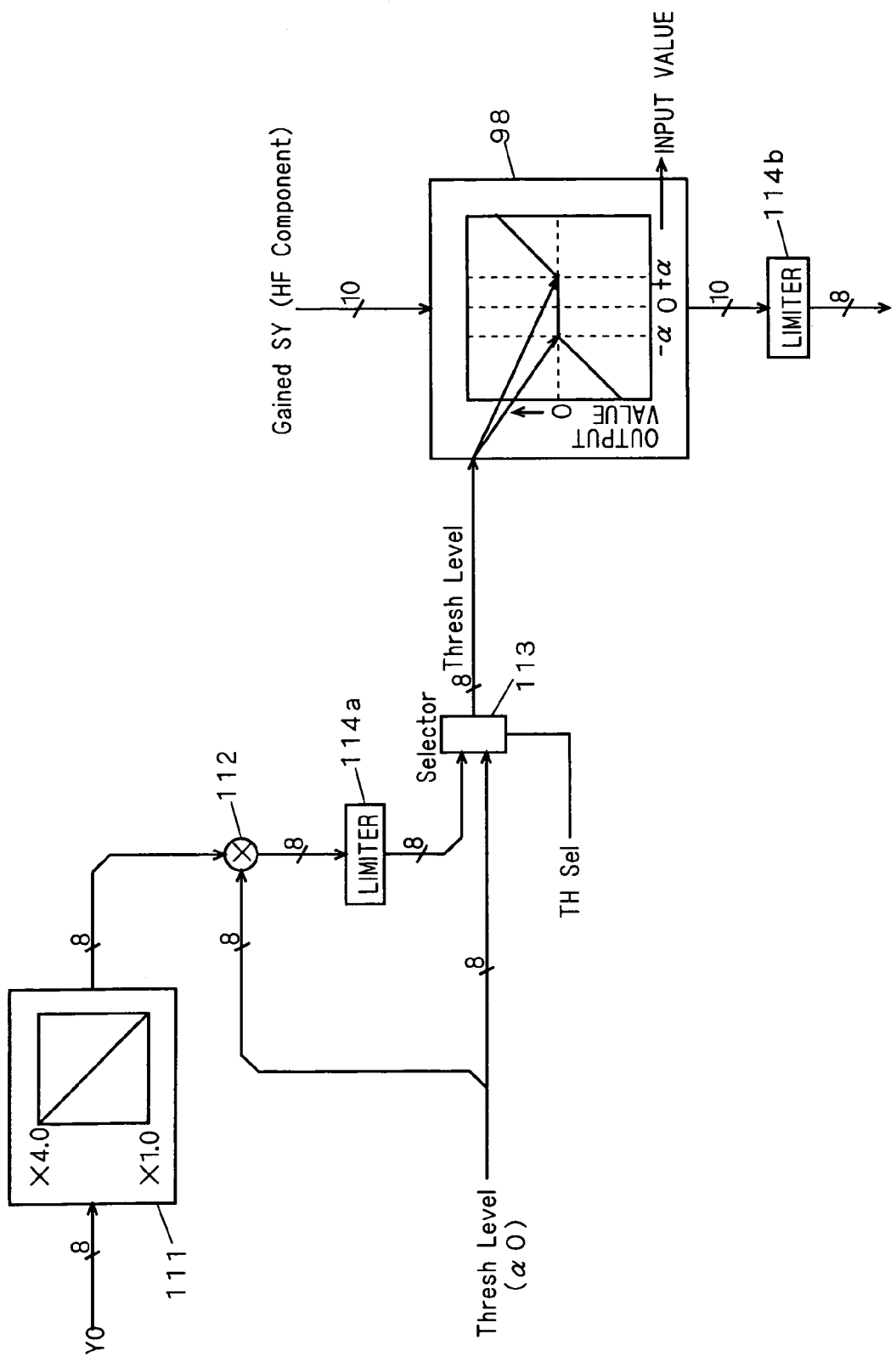

In performing coring processing to the high frequency component after gamma transformation as described, the digital still camera of this embodiment is characterized in that an input value (high frequency signal) to the first coring function 98 is transformed by using gamma characteristic of "Y" signal itself, as shown in FIG. 28; or that a coring threshold value $\alpha$ (threshold level) itself is transformed by using gamma inverse characteristic of "Y" signal itself, as shown in FIG. 29, thereby achieving processing equivalent to the case of performing coring before gamma transformation. Specifically, a bright part where noise is less noticeable (namely, "Y" signal value is large) is made susceptible to contour intensification by setting such that the width of a threshold value $\alpha$ is relatively small to an input value. On the other hand, a dark part where noise is noticeable (namely, "Y" signal value is small) is made unsusceptible to contour intensification by setting such that the width of a threshold value $\alpha$ is relatively large to an input value. Further, the inverse transformation characteristic is set such that correction is excessive. As a result, no strong intensification is applied to the low luminance range whereas strong intensification is applied to the middle and high luminance ranges. This enables to correct image to obtain a more sharp image.

In the case given in FIG. 28, with the value of "Y" signal (Y0), a reverse gamma effect block 106 linearly calculates and selects one to four times values by a positive linear function (ratio transfer function). After a multiplier 107 multiplies the selected value by an input value, a selector 108 selects and inputs the resulting value to the first coring function 98, as an input value (namely, the abscissa of a nonlinear calculation function diagram in the block), and outputs the corresponding ordinate value. This enables to change the width of valid/invalid of an input value to the threshold value $\alpha$, in coring. In FIG. 28, reference numerals 109a and 109b designate a limiter.

In the case given in FIG. 29, with the value of "Y" signal (Y0), a reverse gamma effect block 111 linearly calculates and selects one to four times values by a negative linear function (ratio transfer function). After a multiplier 112 multiplies the selected value by an initial threshold value $\alpha 0$ (threshold level), a selector 113 selects and sets the resulting value as an actual threshold value $\alpha$ of coring in the first coring function 98. This enables to change the width of the threshold value $\alpha$ to an input value, in coring. In FIG. 29, reference numerals 114a and 114b designate a limiter.

Although the revere gamma effect blocks 106 and 111 employ a linear transfer function, they can employ a nonlinear one.

Referring again to FIG. 25, although the color signals ("Cr" and "Cb") are also inputted to the second and third coring functions 103 and 104, coring processing conducted there is handled by a general nonlinear function, and therefore its description is omitted herein.

Configuration and Operation of Real time Processing Unit 23 When Used Interlace Type CCD 21

As previously described, this digital still camera can selectively employ, as a CCD 21 being image pickup device, an interlace type and progressive type one.

Usually when using a progressive type CCD 21, by preparing a line memory of several lines, it is possible that a pixel data readout from the CCD 21, and a general pixel processing, such as pixel interpolation, color transformation and contour intensification, can be carried out at the same time, and that such general image processing can be completed at approximately the same time the data is readout from the CCD 21.

In an interlace type CCD 21, however, a field of even lines (an even field) and a field of odd lines (an odd field) are alternately outputted to the real time processing unit 23. In this connection, as shown in FIG. 30, image captured by the interlace type CCD 21 could be processed in such a manner that both fields are synthesized such as to be a single frame image, and various image processing is not started until the synthesized image is stored in the main memory 29. Unfortunately, in order to store the image data from the CCD 21, the main memory 29 is occupied by a region storing all pixels in the single frame, thus increasing circuit size and consuming much power. Also, image processing cannot be started until readout is completed, thus requiring much time for photographing.

Figure 31:
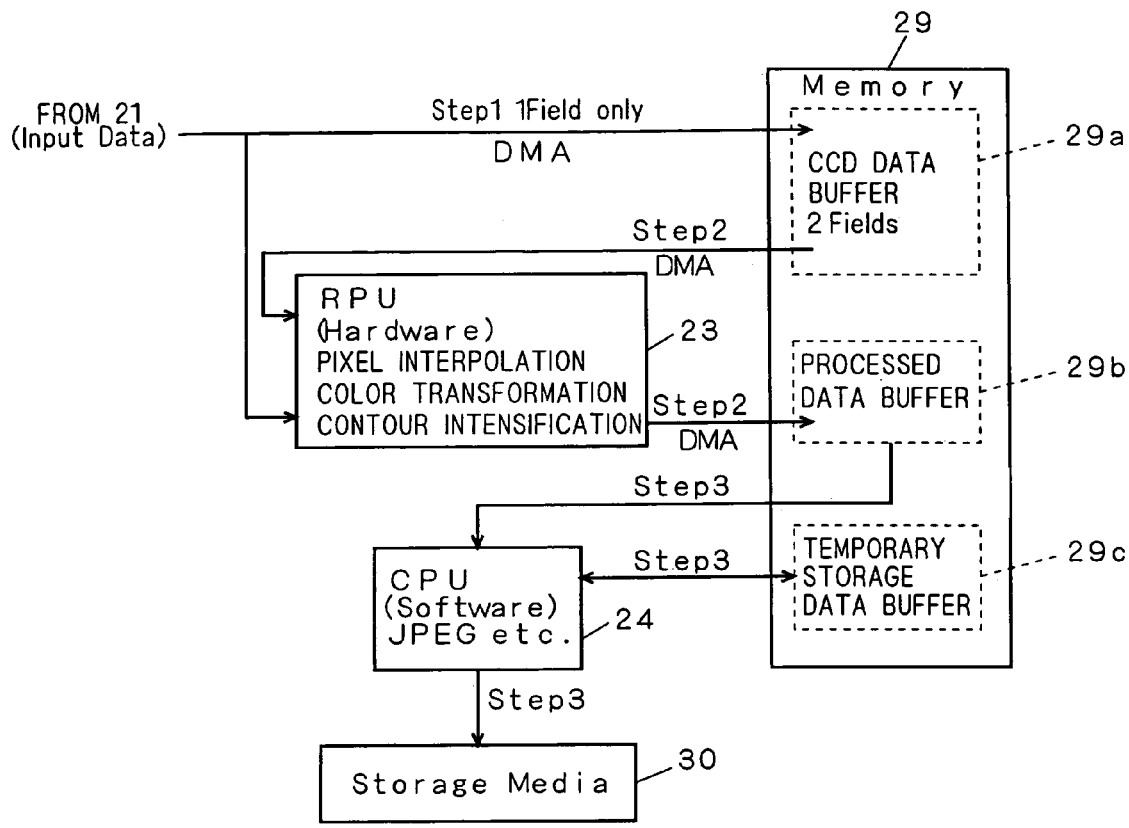
FIG. 31 is a block diagram of data input operation to the real time processing unit in the digital still camera of the preferred embodiment when an interlace type CCD is used.

In view of this, according to the digital still camera of this embodiment, as shown in FIG. 31, the initial field of the interlace type CCD 21 (an odd field or even field, hereinafter referred to as a "first field") is stored in the main memory 29 and, at the same time the second field (an odd field or even field, hereinafter referred to as a "second field") is read out, the first field data is read from the main memory 29 by direct memory access, and then inputted to the real time processing unit 23. Thereby, while the second field is read out from the interlace type CCD 21, a general image processing, such as pixel interpolation, color transformation and contour intensification, can be conducted at the same time, and the general image processing can be completed at the same time the readout of the second field is completed. In addition, a storage region of only one field (½ frame) is needed in storing the data from the CCD 21 in the main memory 29, allowing to reduce the necessary capacity in the main memory 29 to one half.

When Using CCD 21 Having Horizontal Pixels Exceeding the Number of Pixels of Line Memories 61a, 61b and 92a to 92d in Real Time Processing Unit 23

Figure 32:
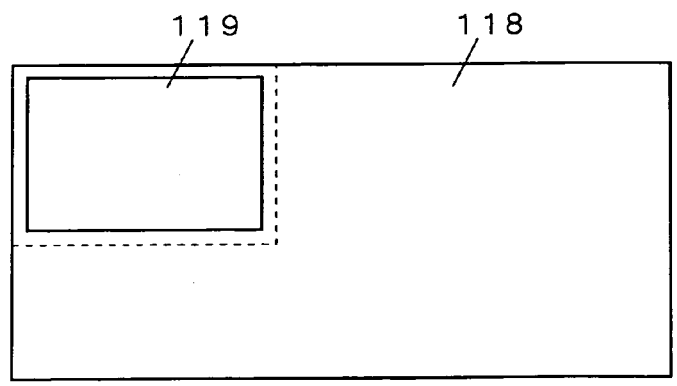
FIG. 32 is a diagram illustrating operation that processing is made by dividing a screen into a plurality of blocks.
Figure 33:
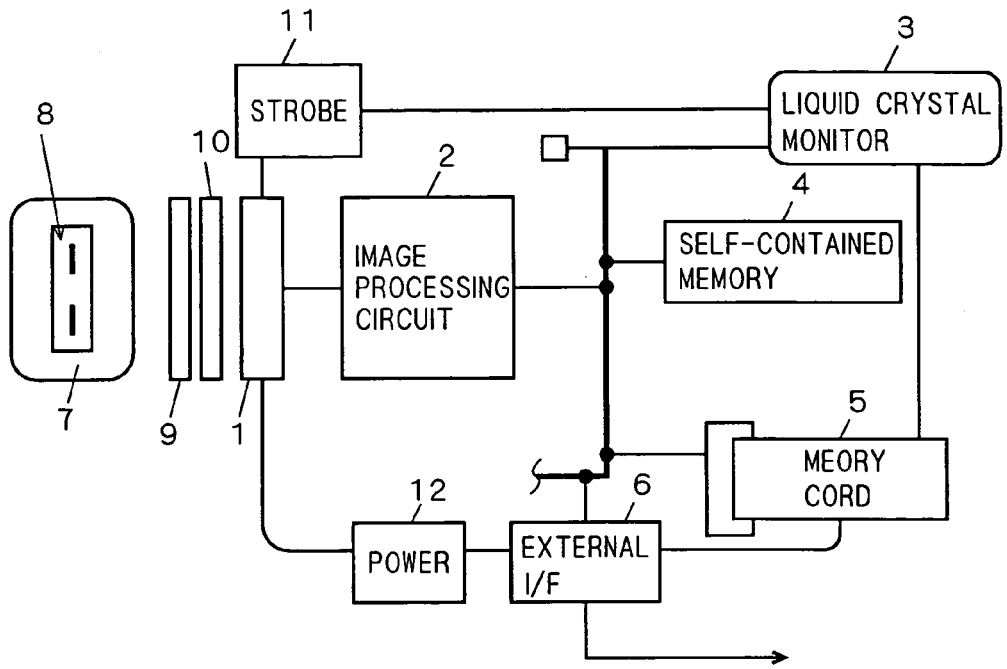
FIG. 33 is a block diagram illustrating the overall construction of a conventional digital still camera.

In this digital still camera, as a CCD 21, various type ones can be selectively used, as stated earlier. The number of horizontal pixels of the CCD 21 could exceed the number of line memories 61a, 61b and 92a to 92d, as shown in FIGS. 14 and 25. As to a CCD 21 having such a large element array, data of the CCD 21 is temporarily stored in the main memory 29 and, as shown in FIG. 32, image in an image frame 118 is horizontally divided into multiple blocks 119, and then inputted to the real time processing unit 23 by direct memory access. This permits a high speed processing.

Usually in real time processing (general image processing) of image from a CCD 21, most processing is required to refer to pixels of vertical lines, thus requiring multiple line memories covering the number of horizontal pixels. Therefore, supposing that image from the CCD 21 is directly processed by the real time processing unit 23, the processable horizontal pixel size of the CCD 21 is restricted by the number of pixels of the line memories 61a, 61b and 92a to 92d, which are contained as hardware. It is however difficult to ensure a greater area of the real time processing unit 23 than the drive circuit of the CCD 21, because the line memories 61a, 61b and 92a to 92d occupy an extremely large area on an integrated circuit. As a result, it cannot be avoided that the number of processable horizontal pixels is small, making it difficult to use a CCD 21 having a large number of pixels.

Whereas in the digital still camera of this embodiment, data temporarily stored in the main memory 29 is processed after it is inputted to the real time processing unit 23 by direct memory access. Therefore, no restriction is imposed on the horizontal pixel size of a CCD 21, by that the image frame 118 is horizontally divided into multiple blocks 119 and then subjected to real time processing in the real time processing unit 23. Accordingly, if the capacity of the main memory 29 is permitted, any large processing of the CCD 21 is possible, leading to an improved versatility of the real time processing unit 23 with respect to the CCD 21.

Although the foregoing embodiment has been mainly discussed taking a digital still camera as an example, it is easily applicable as an image processing circuit of other image input device.

Also, in the spatial filter & coring block 44 shown in FIG. 25, the selector 105a selects, as a fourth color component, one of "Y" component, "Cb" component, "Cb" component, and an output value from the multiplier 97 (an output value itself from the spatial filter 91). Alternatively, a similar selector may be disposed on other output line, so that not only the fourth color but also the respective components of other three colors are free to be switched to a different component. This enables to change output components more freely, and improve versatility as an image processing circuit.

While the invention has been shown and described in detail, the foregoing description is in all aspects illustrative and not restrictive. It is therefore understood that numerous modifications and variations can be devised without departing from the scope of the invention.

What is claimed is:

1. An image processing circuit of an image input device which performs a predetermined image processing of image photographed by an image pickup device in said image input device, said circuit comprising:
    a real time processing unit in which a predetermined general image processing of a pixel data being photographed by said image pickup device and inputted sequentially is performed by real time processing;
    a main memory that stores a pixel data outputted from at least said real time processing unit, in image frame units; and
    a central control unit in which with respect to image temporarily stored in said main memory, exceptional image processing except for said general image processing is executed as a software program processing, and then stored in said main memory, characterized in that:
    said real time processing unit further comprises:
    a gamma compensation table capable of performing, when given a N-bit length pixel data, gamma compensation processing about said pixel data; and
    a selector in which, when given a N-bit length pixel data, said pixel data is inputted to said gamma compensation table; and when given a (N-2)-bit length pixel data, switching is made so that four data rows sequentially provided as a (N-2)-bit length pixel data, are respectively inputted to four look-up tables obtained by dividing said gamma compensation table into four.

* * * * *